(12) United States Patent
Jensen et al.

(10) Patent No.: US 10,014,952 B2
(45) Date of Patent: Jul. 3, 2018

(54) DECODING A COMBINED AMPLITUDE MODULATED AND FREQUENCY MODULATED SIGNAL

(71) Applicant: DANMARKS TEKNISKE UNIVERSITET, Kgs., Lyngby (DK)

(72) Inventors: Jesper Bevensee Jensen, Albertslund (DK); Bo Pedersen, Kastrup (DK); Roberto Rodes Lopez, Santa Cruz, CA (US)

(73) Assignee: DANMARKS TEKNISKE UNIVERSITET, Lyngby (DK)

( * ) Notice: Subject to any disclaimer, the term of this patent is extended or adjusted under 35 U.S.C. 154(b) by 88 days.

(21) Appl. No.: 15/117,048

(22) PCT Filed: Feb. 6, 2015

(86) PCT No.: PCT/EP2015/052535
§ 371 (c)(1),
(2) Date: Aug. 5, 2016

(87) PCT Pub. No.: WO2015/118118
PCT Pub. Date: Aug. 13, 2015

(65) Prior Publication Data
US 2016/0352432 A1    Dec. 1, 2016

(30) Foreign Application Priority Data
Feb. 7, 2014 (EP) .................... 14154237

(51) Int. Cl.
*H04B 10/00* (2013.01)
*H04B 10/61* (2013.01)

(52) U.S. Cl.
CPC ......... *H04B 10/612* (2013.01); *H04B 10/616* (2013.01); *H04B 10/611* (2013.01); *H04B 10/615* (2013.01); *H04B 10/6164* (2013.01)

(58) Field of Classification Search
CPC .. H04B 10/612; H04B 10/616; H04B 10/611; H04B 10/615; H04B 10/6164
(Continued)

(56) References Cited

U.S. PATENT DOCUMENTS 4,829,598 A    5/1989 Auracher et al.
4,856,093 A    8/1989 Mohr
(Continued)

FOREIGN PATENT DOCUMENTS

CN    101938438 A    1/2011
EP    0145971 A1    6/1985
(Continued)

OTHER PUBLICATIONS

International Search Report and Written Opinion for related PCT Application No. PCT/EP2015/052535, dated May 7, 2015, in 12 pages.
(Continued)

*Primary Examiner* — M. R. Sedighian
(74) *Attorney, Agent, or Firm* — Procopio, Cory, Hargreaves & Savitch LLP

(57) ABSTRACT

The present disclosure relates to a method for decoding a combined AM/FM encoded signal, comprising the steps of: combining said encoded optical signal with light from a local oscillator configured with a local oscillator frequency; converting the combined local oscillator and encoded optical signal into one or more electrical signals by means of at least one opto-electrical converter having a predefined frequency bandwidth, thereby providing an amplified and encoded electrical signal having one or more encoded signal current(s), where one type of states have a higher oscillation frequency than other type of states; rectifying the encoded signal current(s), thereby obtaining an encoded power spectrum, wherein said power spectrum has different states, such (Continued)

as "0"-states and "1"-states, with different power levels such that they can be discriminated, said local oscillator frequency is defined by a positive local oscillator frequency-offset from the frequency of one of the states in said encoded optical signal, and said local oscillator frequency-offset is selected to be dependent on said frequency bandwidth.

27 Claims, 25 Drawing Sheets

(58) Field of Classification Search
USPC .......................................................... 398/115
See application file for complete search history.

(56) References Cited

U.S. PATENT DOCUMENTS

| 5,142,402 | A | 8/1992 | Tsushima et al. | |
|---|---|---|---|---|
| 2005/0069333 | A1 | 3/2005 | Moeller | |
| 2010/0189445 | A1* | 7/2010 | Nakashima | H04B 10/60 |
| | | | | 398/152 |
| 2010/0221020 | A1* | 9/2010 | Koc | H04B 10/61 |
| | | | | 398/205 |
| 2013/0027763 | A1 | 1/2013 | Hauenschild et al. | |
| 2014/0270809 | A1* | 9/2014 | Shibutani | H04B 10/616 |
| | | | | 398/208 |

FOREIGN PATENT DOCUMENTS

| GB | 2172766 | A | 9/1986 |
|---|---|---|---|
| RU | 2097927 | C1 | 11/1997 |
| RU | 2124236 | C1 | 12/1998 |
| WO | 2012153220 | A1 | 11/2012 |

OTHER PUBLICATIONS

Emura et al. "4 to 5 Gb/s phase diversity homodyne detection experiment." Jan. 1, 1988, pp. 57-60.

Emura et al. "Novel Optical FSK Heterodyne Single Filter Detection System Using a Directly Modulated DFB-Laser Diode." Electronics Letters. 20(24):1022-1023. Nov. 22, 1984.

Chung et al. "Novel FSK Heterodyne Single-Filter Detection System Using No IF Frequency Lock." IEEE Photonics Technology Letters. 1(6):140-141. Jun. 1, 1989.

Written Opinion of the International Preliminary Examining Authority for related PCT Application No. PCT/EP2015/052535, dated Jan. 4, 2016, in 6 pages.

International Preliminary Report on Patentability for related PCT Application No. PCT/EP2015/052535, dated Mar. 18, 2016, in 41 pages.

Extended European Search Report for related EP Patent Application No. 14154237.3, dated Jul. 22, 2014, in 7 pages.

First Office Action for Chinese application No. 201580007636.1 dated Apr. 27, 2018, 6 pages.

Office Action for Russian application No. 2016132119 dated May 17, 2018, 7 pages.

\* cited by examiner

| 5 GHz PD bandwidth B2B | -1.1 GHz / +1.5 GHz |
| --- | --- |
| 5GHz PD bandwidth 100 km SSMF | -0 GHz / + 1.7 GHz |
| 7.5 GHz PD bandwidth B2B | -2.7 GHz / +1.8 GHz |
| 7.5 GHz PD bandwidth 100 km SSMF | -2.0 GHz / + 3.0 GHz |

DECODING A COMBINED AMPLITUDE MODULATED AND FREQUENCY MODULATED SIGNAL

FIELD OF INVENTION

The present disclosure relates to encoding and decoding a combined amplitude modulated (AM) and frequency modulated (FM) signal.

BACKGROUND OF INVENTION

A communication system is the generation, transmission, reception and decoding of information, which may be represented as a series of "0"-states and "1"-states; and is extremely important for society. In optical communication systems using directly modulated lasers, frequency chirping may occur. This is an effect causing the optical wavelength (or frequency) to be dependent on the optical power. In other words, the wavelength (or frequency) of a "0"-state will differ from that of the "1"-state. Frequency chirp in communication systems are considered undesirable and far from optimal, as it limits transmission distance due to chromatic dispersion in the transmission fiber which converts the chirp-induced frequency broadening to time-broadening which causes neighboring symbols to overlap and therefore to be erroneously decoded. As a consequence, frequency chirped modulation is not preferred in optical communication systems. Rather, modulators or lasers are made such that frequency chirping is suppressed enough to be used for optical communication systems.

Chirp-free operation requires either chirp-managed lasers or external modulators; both of which come with high price and increased power consumption and heat. On the other hand, modulators or lasers with frequency chirping come with low cost. There is therefore an economical asset if frequency chirped modulators can be tolerated better in for example optical communication systems.

There are solutions, which allow frequency chirped modulators to be used in optical communications systems, but these have means for compensating the frequency chirping. This means that for example filters or more complex hardware solutions are required to be implemented in such a way that the dynamic line width broadening is being eliminated and hence not exploited.

What is missing is a communication system that not only tolerates frequency chirped modulation, but also takes advantage of the dynamic line width broadening inherent in the frequency chirped modulation.

In optical communication systems, there are two well-known detection techniques:
Direct detection
Coherent detection Direct detection is the detection of amplitude only whereas coherent detection is the detection of both amplitude and phase. Coherent detection has many advantages over direct detection, including higher sensitivity than direct detection and is therefore increasingly preferred in long-reach (core network) communication systems where transceiver cost is shared by a high number of users opposed to metro and access networks which are very sensitive to transceiver cost. Coherent detection requires, however, information of the carrier phase as the signal is demodulated by a local oscillator (LO) controlled by a phase-locked loop that serves as an absolute phase reference. Operation with phase locked loops puts strict requirements on the system side. Two well-known requirements for phase locked loops are:
Synchronisation between the LO and the encoder
Narrow optical line width of the LO and the encoder If these requirements are not met, coherent detection is not working properly. The phase locked loop can be made either in the optical (analog) domain or in the digital domain with digital signal processing (DSP). Regardless of how the phase locked loop is implemented, coherent detection is always required to operate with high cost lasers with narrow optical line widths. In future optical communications systems for metro and access networks, there is a need for a detection technique that provides a low cost solution.

SUMMARY OF INVENTION

In order to address and solve the above described problems and needs, the present disclosure relates to a communication system using and exploiting frequency chirping. Specifically, the present disclosure relates to a communication system that provides encoding and decoding in a communication system, where a phase-locked loop may be possible to eliminate, and thus provide a low cost solution for optical communications systems.

The present disclosure describes signalling employing a combined amplitude modulation (AM) and frequency modulation (FM), such as obtained with a frequency chirped laser, and decoding this combined AM and FM encoded signal, comprising the steps of: combining said encoded optical signal with light from a local oscillator configured with a local oscillator frequency; converting the combined local oscillator and encoded optical signal into one or more electrical signals by means of at least one opto-electrical converter having a predefined frequency bandwidth, thereby providing an amplified and encoded electrical signal having one or more encoded signal current(s), where one type of states have a higher oscillation frequency than other type of states; rectifying the encoded signal current(s), thereby obtaining an encoded power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal, and said local oscillator frequency-offset is selected to be dependent on said frequency bandwidth.

The present disclosure describes signalling, comprising the steps of encoding the optical signal by amplitude and frequency modulation, and decoding the combined AM and FM signal, and wherein the encoding or decoding of a combined AM and FM signal is using two or more levels. Two levels, such as "0"-states and "1" states are typically used, such that the different states are separated in frequency and amplitude, but a communication systems may also employ an alphabet comprising more than two states. This is typically denoted "advanced modulation format", "higher-order modulation format" or "multilevel modulation format". The advantage is that by using more than two states, it is possible to encode more than one bit of information into a single symbol. As examples, a system employing four amplitude levels will be able to encode two bits pr. symbol, a system employing four frequency levels will be able to encode two bits per symbol, and a system which independently employs four amplitude and four frequency levels will be able to encode four bits pr. symbol. Apart from amplitude and frequency, the information may also be encoded in the phase of the carrier, in the polarization of the carrier, as variations in pulse-width or as variations in pulse position.

The present disclosure also provides a detector system for decoding a combined AM and FM encoded optical signal comprising at least two different types of states, such as "0"-states and "1"-states, comprising: a local oscillator configured with a local oscillator frequency; a coupling device configured for coupling the encoded optical signal with light from the local oscillator; one or more opto-electrical converter(s) having a predefined frequency bandwidth, configured for providing an amplified and encoded electrical signal having one or more encoded signal current(s) where one type of states have a higher oscillation frequency than another type of states; a rectifier configured for rectification of said signal current(s) to provide a power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal, and said local oscillator frequency-offset is selected to be dependent on said frequency bandwidth.

Additionally, the detector may comprise a low pass filter configured for reducing the residual power of one type of states relatively to another type of state, such as "0"-states and "1"-states, with different power levels which can be discriminated more easily.

Accordingly, the present disclosure further relates to an optical communication system comprising at least one transmitter and at least one receiver comprising the herein disclosed detector system.

LIST OF FIGURES

DETAILED DESCRIPTION OF THE INVENTION

Eliminated Phase Locked Loop

Figure 1:
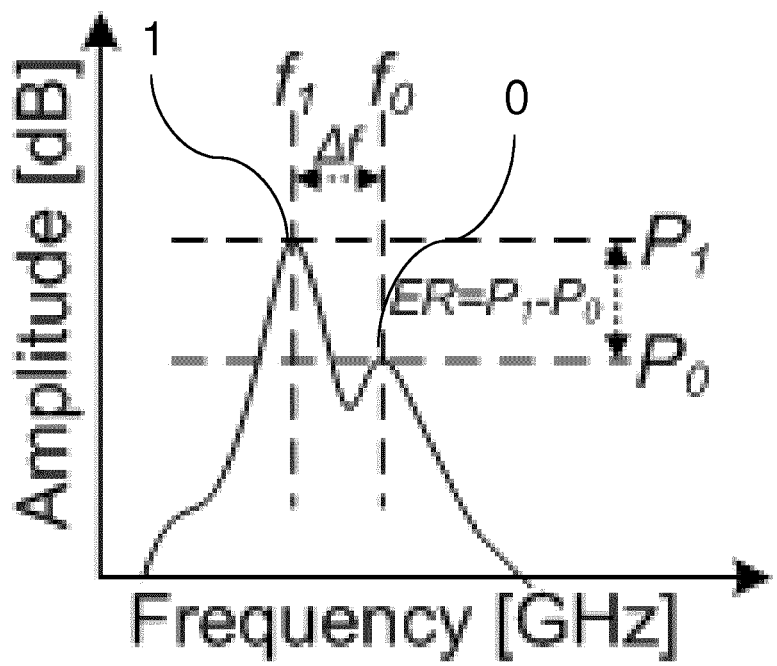
FIG. 1 shows an embodiment of a spectrum of a combined AM and FM signal before light from the local oscillator is combined with the signal.

Since coherent detection per se requires a phase locked loop of a local oscillator, the present disclosure may be seen as different from coherent (synchronous) detection. The present disclosure may rather be defined as asynchronous detection, meaning that the local oscillator may be operating without a phase locked loop or may be operating without being synchronized to the signal. Whereas coherent detection systems include some kind of phase locked loops, either analog or digital, the present disclosure does not require neither analog nor digital phase locked loops. One advantage of the present disclosure is thus the ability to eliminate the need of analog/digital phase locked loops. In the present disclosure, the phase-locked loop may be eliminated by taking advantage of frequency chirping. The present disclosure uses a signal that is both amplitude and frequency modulated, such as obtained with a frequency chirped modulator, and such that this, in combination with the decoding of the combined AM and FM signal, may eliminate the need for a phase locked loop. The FM is responsible for splitting the levels into different frequencies, whereas the AM is responsible for splitting the levels into different powers. Hence, combining AM and FM signalling implies that the encoded signal is given additional information about the different states encoded by the FM signal. It is the combination of rectification and the combined AM and FM signal that may eliminate the need for phase locked loop. Whereas previous belief states that frequency chirped communication systems provide a sub-optimal solution, the present disclosure exploits frequency chirping and provides an optimal solution to frequency chirped communication systems with increased receiver sensitivity, wavelength (channel) selectivity, and improved transmission performance. In this way, the present disclosure relates to a communication system that provides the advantages of coherent detection, i.e. increased receiver sensitivity, wavelength (channel) selectivity, and improved transmission performance. Furthermore, the present disclosure relates to a communication system without the drawbacks of coherent detection; the present disclosure works with frequency chirped modulation and does not require a phase locked loop, neither analogue nor digital. As a consequence, it may therefore be possible to use low cost lasers with broad line widths as the local oscillator, but also as the AM and FM transmitter/encoder, thereby reducing the overall cost, in particular for future optical communications systems. As an example, the present disclosure may provide a method and a system for asynchronous detection using a vertical cavity surface emitting laser (VCSEL) as local oscillator (for decoding) and a directly modulated VCSEL as transmitter or modulator (for encoding). Using a local oscillator operating without a phase locked loop, may allow for a method and a system, where no need is for a complex algorithm or hardware for phase-locked loops to be implemented.

In one embodiment, it is possible to use a local oscillator operating with a phase locked loop. Using it like this, the receiver becomes a coherent detector. Using a local oscillator operating with a phase locked loop and the combined AM and FM transmission may still provide a system and a method which yield improved chromatic dispersion tolerance and improved extinction ratio. It is therefore not a requirement that the local oscillator is operating without a phase locked loop, but rather an advantage.

Opto-Electrical Conversion

In one embodiment of the present invention, the step of converting the optical signal into one or more electrical signals is providing by means of at least one opto-electrical converter having a predefined frequency bandwidth.

Tolerance of Limited Amplitude Extinction Ratio

Using directly modulated devices may provide the ability to operate at a limited amplitude extinction ratio at the transmitter. As some of the residual power in one state may be further reduced or removed by low pass filtering, the present disclosure may be more tolerant to limited amplitude extinction ratio.

Eliminated Dispersion Compensation

One advantage of the present disclosure may be the ability to operate with the high dynamic frequency chirping of directly modulated lasers. Since the chirp-induced spectral broadening may be removed by the process of coupling with the LO, rectification and low-pass filtering, the achievable transmission distance using chirped lasers may be improved. Another advantage of the present disclosure may be the ability to reduce the chromatic dispersion effected spectrum. Thus the chromatic dispersion tolerance may be improved over direct detection methods. Another advantage of the present disclosure may be the ability to eliminate the need of analog/digital dispersion compensation.

Low Pass Filtering

The typical effect of a low pass filter is to remove ripples from a signal, and hence the role of the low pass filter may also be to clean the signal as in a conventional configuration. In some embodiments, it is the low pass filter in combination with the combined AM and FM signal that allows for the ability to operate at a limited amplitude extinction ratio and also the ability to operate with the high dynamic frequency chirping of directly modulated lasers. Low pass filtering may be applied digitally or analogically.

Threshold Detection

In one embodiment, it may be required to apply threshold to the power spectrum such that different states, such as "0"-states and "1"-states, are automatically detected. In this way, it may be possible to get information about the encoded states. Threshold detection may be implemented by using a threshold detection module, also called a decision circuit. Threshold detection may be applied digitally or analogically.

Coupling

The coupling device may be a 3 dB coupler, a 6 dB coupler or a 90-degree hybrid or similar device. Various couplers or hybrids are possible to use, but the 3 dB coupler is in general simpler than a 90-degree hybrid, and hence a 3 dB coupler may be preferable. The one or more optical-electrical converters may be photo diodes.

Rectification

The rectifier is a device configured for performing rectification. The rectifier and the rectification is a part of the decoding. Rectification may be applied digitally or analogically. Using a rectifier may provide reduced computational complexity and/or hardware and accordingly the overall cost. For example, the rectifier may be used without an analog/digital (A/D) converter. One advantage of the present disclosure is thus the ability to eliminate the need of analog/digital (A/D) converters. Rectification may be performed as half-wave rectification such that either the positive or negative part of the signal is removed. Half-wave rectification may be possible with a gate with a non-linear transfer function. A gate may be biased such that the e.g. negative part of the signal is lower than the threshold of the gate. Rectification may also be performed as full-wave rectification such as a squaring element, where all negative values are converted to positive values. As described, rectification may be squaring. This may be implemented in hardware or software. In the case, where implemented in software, an analogue/digital converter may be implemented before processed in a digital signal processor (DSP). An alternative to squaring may be obtained by Hilbert transforming the signal. Various other solutions may however be possible. Examples of analogue rectifiers include XOR gates, and diode bridges. Both the XOR gates and the diode bridges allow for real-time signal processing without DSP, and may thus be preferred over a DSP.

Sensitivity

One advantage of the present disclosure may be that it provides a performance improvement similar to that of coherent detection being able to operate with 10-15 dB lower input than with direct detection. It is due to the amplification from the local oscillator that this performance may be achieved.

Encoding

In one embodiment of the present disclosure, the signal is encoded by one or more simultaneous AM and FM device, such as a frequency chirped laser and/or direct modulated laser, in particular a DML or a VCSEL. Hence, the transmitter is configured to generate a combined AM and FM signal by one or more combined AM and FM device(s), such as a frequency chirped laser, in particular a DML or a VCSEL. Both DMLs and VCSELs have a broad linewidth and in general low cost.

In another embodiment of the present disclosure, the signal is encoded by one or more separate AM device(s) and one or more separate FM device(s) such that this allows for use of more advanced modulation formats with more amplitude and frequency levels. Hence, the transmitter is configured to generate a combined AM and FM signal by one or more separate AM devices and by one or more separate FM devices.

Regardless of how the combined AM and FM signal is generated, the frequency modulation is responsible for the different states are converted to different frequencies, whereas the amplitude modulation is responsible for separating the different states in amplitude, thereby conveniently supplying further information of the different states as conventional systems do not include.

The different frequencies, i.e. the different states, are separated by a frequency separation, also called a FM shift. Thus, the FM shift is defined as the frequency separation between the two states of the frequency modulated (FM) signal. As an example, the FM shift is the difference between the "0"-states and the "1"-state of the combined AM-FM signal, i.e. the optical signal.

In one embodiment of the present invention, the frequency modulation is configured such that the frequency separation, i.e. the FM shift, between the states in the optical signal is less than 15 GHz, or less than 14 GHz, or less than 13 GHz, or less than 12 GHz, or less than 11 GHz, or less than 10 GHz.

In another embodiment of the present invention, the frequency modulation is configured such that the frequency separation between the states in the optical signal is dependent on the frequency bandwidth of the opto-electrical converter.

In yet another embodiment of the present invention, the frequency modulation is configured such that the frequency separation between the states in the optical signal is proportional with a proportionality factor to the frequency bandwidth of the opto-electrical converter.

In a preferred embodiment of the present invention, the proportionality factor is between 0.2 and 1.4, such as between 0.4 and 1.2, such as between 0.8 and 1.2, such as between 0.9 and 1.1, such as 1.

In some embodiments of the present invention, the proportionally factor is dependent on the transmission distance.

In other embodiments of the present invention, the proportionally factor is dependent on the transmission speed, defined by the data transfer speed, measured in Gbps.

The Signal

In one embodiment, the signal is an optical signal. In some embodiments, the signal may be an RF signal. Furthermore, the signal may be a signal in free space or in an optical fibre. Also, the signal may comprise one or more wavelength channels.

In a most preferred embodiment of the present invention, the signal, for example the optical signal is configured with an AM extinction ratio between 3 dB and 6 dB, preferably between 4 dB and 5 dB, more preferably approximately 4.5 dB. Using such a configuration may for example allow for a simple setup of the transmission system.

The Local Oscillator

In one embodiment, the local oscillator is an uncooled laser, such as a DML and/or VCSEL. Whereas uncooled lasers are low cost, a high cost temperature controlled laser may also be used as the local oscillator. The local oscillator may be tuned to a frequency or a wavelength of the signal. This can either be an in-band or an out-of-band configuration. In an in-band configuration, the LO is tuned to a frequency or wavelength within a spectrum of the signal. In an out-of-band configuration, the LO is tuned to a frequency or wavelength outside a spectrum of the signal. In this way, wavelength selectivity may be achieved using the local oscillator. Using the local oscillator as a wavelength selector implies that the present disclosure can be used without filters. However, wavelength channels may be filtered by one or more optical filters. By tuning the local oscillator to a frequency, where one type of state is located, the state may be up-converted to a frequency which may be lower than another up-converted state. The signal may in general be up-converted to a frequency which is equal to the instantaneous frequency difference between that of the signal and the LO. In some embodiments, the tuning may be system dependent; in particular the tuning may be dependent on the temperature. Thus, a tuning to a given state may include tuning the LO to frequency or wavelength inside or outside the spectrum.

The local oscillator may be used as wavelength selectivity means, similar to coherent detection, thereby eliminating the need of an optical filter before the detector.

In one embodiment of the present invention, the local oscillator has a frequency higher than one of the states, where one of the states is a state with the highest amplitude.

In another embodiment of the present invention, the local oscillator frequency-offset is greater than the bandwidth of the opto-electrical converter.

In yet another embodiment of the present invention, the local oscillator frequency-offset is selected to be between 1 and 1.5 times the bandwidth of the opto-electrical converter, most preferably approximately 1.2 times the bandwidth of the opto-electrical converter. In the meaning of approximately, is here to be understood a deviation of up to 20%.

Error Detection

In another embodiment, error detection may advantageously be implemented for system verification. Error detection may be implemented using an error detection module, such as a bit-error-rate-tester.

Polarization Independence

In one embodiment of the present disclosure, it may be preferable to obtain polarization independence, for example if implemented in commercial systems. Several methods exist to obtain polarization independence. One method may be to use a polarization diversity receiver, which may include splitting the signal and light from the local oscillator into two orthogonal polarizations, thereby obtaining four channels, and then combining these four channels. Another way to obtain polarization independence may be to use polarization scrambling. Various other methods may be used. A third way to obtain polarization independence may be by adaptive polarization control, implying aligning the polarization of the signal to that of the light. Alternatively, polarization independence may be obtained by aligning the polarization of the light to that of the signal. In a preferred embodiment this may be done automatically. This could for example be achieved by scanning and controlling the polarization of the LO. Alternatively, it may be achieved by scanning and automatically controlling the polarization of the signal, where the scanning and controlling may include a maximization of the combined signal. In a manual configuration, the polarization of the signal or light may be polarized to that of the light or signal using a manual polarization controller.

EXAMPLES

Example 1—Spectrum Before Combination with LO

FIG. 1 shows an embodiment of a spectrum of a combined AM and FM signal before light from the local oscillator is combined with the signal. The spectrum has two peaks corresponding to a "0"-state 0 and a "1"-state 1. The "0"-state 0 is separated from the "1" 1 state both in frequency and amplitude. The extinction ratio is the power ratio between the "0"-state and the "1"-state.

Example 2—Spectrum after Combination with LO

Figure 2:
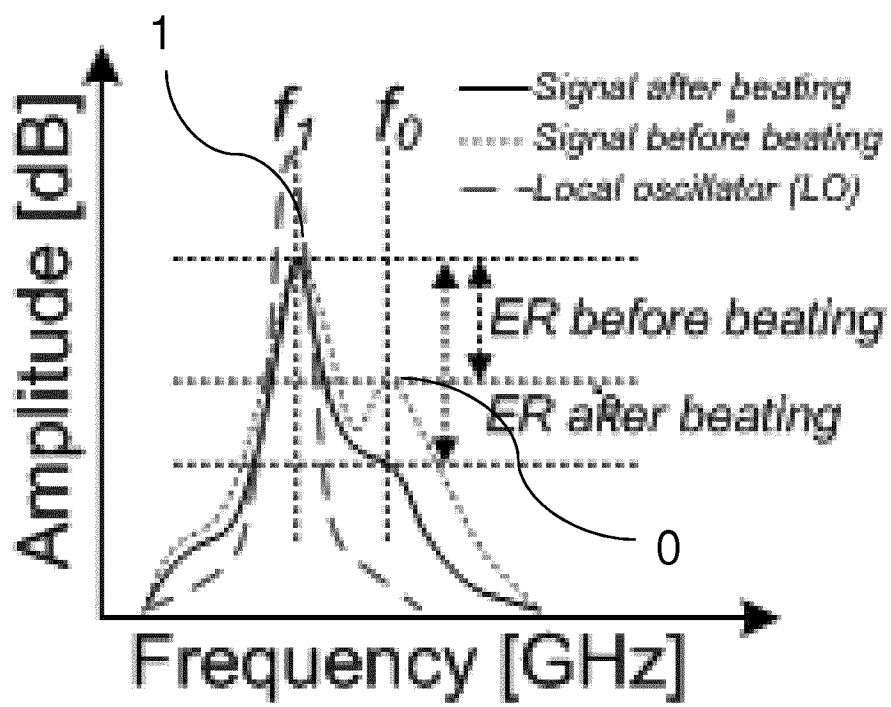
FIG. 2 shows an embodiment of a spectrum of a combined AM and FM signal before and after light from the local oscillator is combined with the signal, also called beating.

FIG. 2 shows an embodiment of a spectrum of a combined AM and FM signal before and after light from the local oscillator is combined with the signal, also called beating. It can be seen that the local oscillator is tuned to a frequency, where the "1"-state 1 is located. The LO is tuned close but not exactly to the "1"-state 1. The "1"-state is up-converted to a frequency which is lower than the up-converted "0"-state 0. The extinction ratio is the power ratio between the "0"-state 0 and the "1"-state 1. It is interesting to note that after beating the signal with the light from the local oscillator, followed by rectifying the signal, the "0"-state is lowered, thereby giving an improved extinction ratio. When the signal is in the "1"-state 1, the amplitude is high, and the oscillation frequency is low. When the signal is in the "0"-state 0, the amplitude is low and the oscillation frequency is high.

Example 3—Signal Before Rectification

Figure 3:
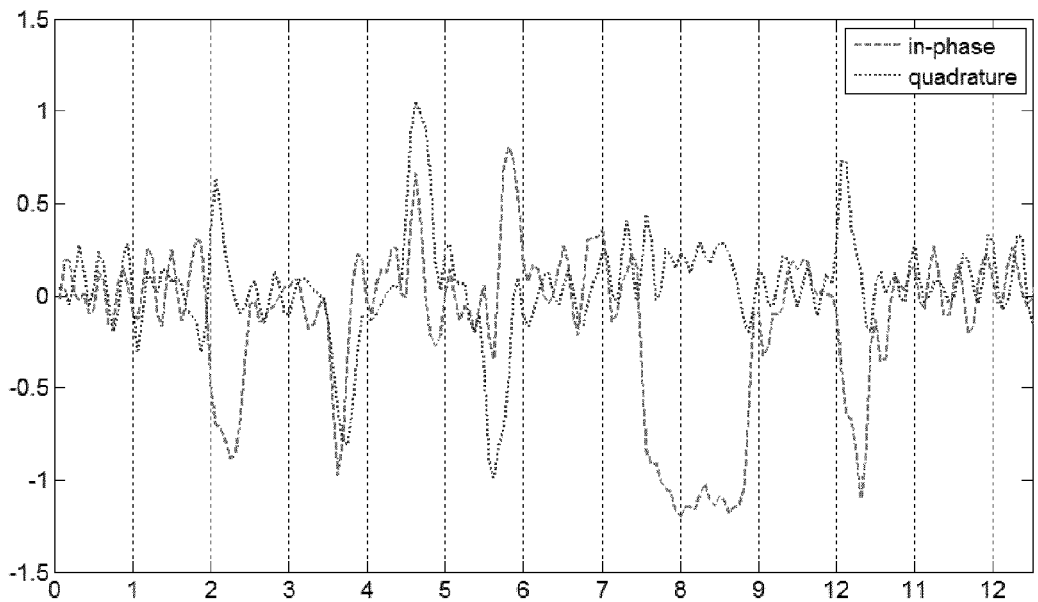
FIG. 3 shows an embodiment of a signal level before rectification.

FIG. 3 shows an embodiment of a signal level before rectification. This signal is obtained using a 90 degree hybrid such that the signal comprises in-phase and quadrature components. From this signal, the in-phase and quadrature components of the signal do not by themselves give information about the signal.

Example 4—Signal after Rectification

Figure 4:
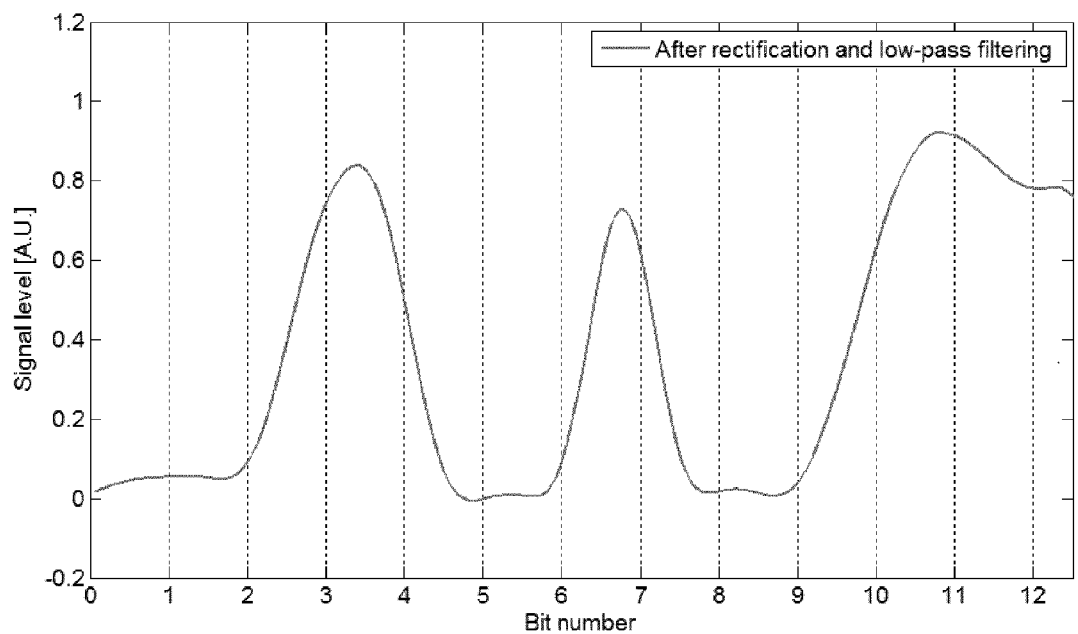
FIG. 4 shows an embodiment of a signal level after rectification and low pass filtering.

FIG. 4 shows an embodiment of a signal level after rectification and low pass filtering. This signal is obtained using a 90 degree hybrid such that the signal comprises in-phase and quadrature components. The in-phase and quadrature is combined to a single signal and then rectified. From this signal, the rectified signal gives information about the signal. Information regarding "0"-state and "1"-state is meaningful and can be determined using threshold detection.

Example 5—Rectification

Figure 5:
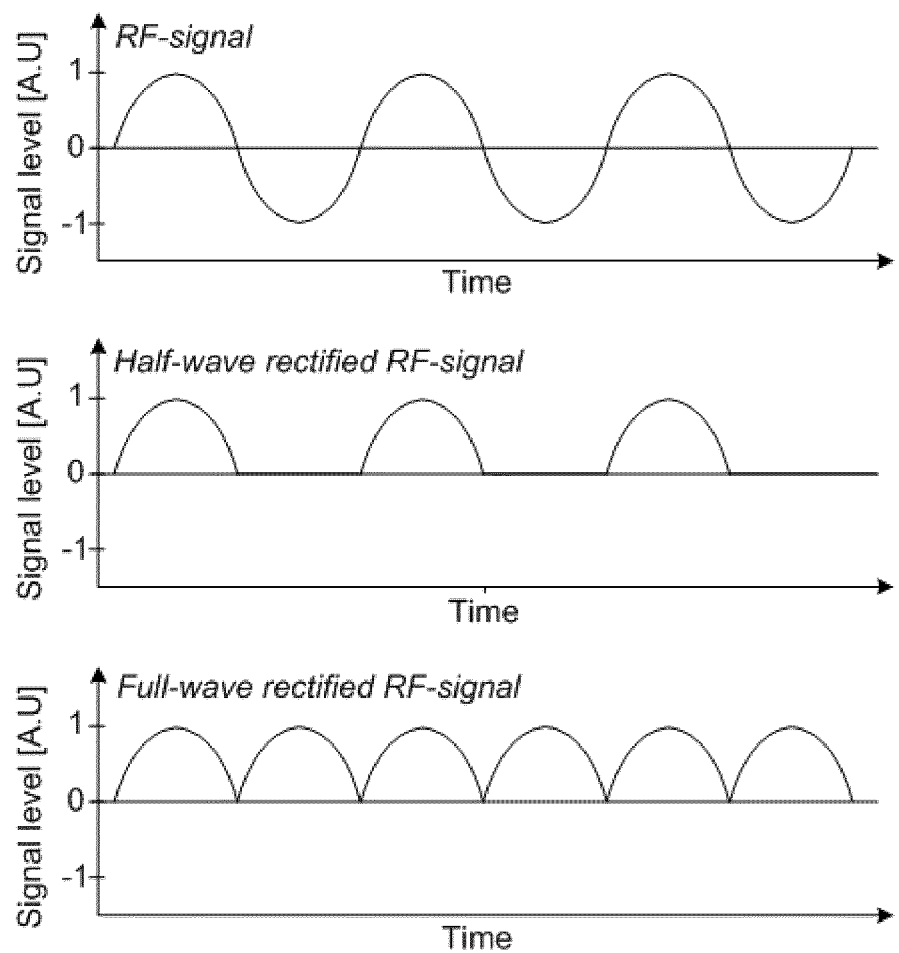
FIG. 5 shows embodiments of half-wave and full-wave rectification of an RF signal.

FIG. 5 shows embodiments of half-wave and full-wave rectification of an RF signal. Using half-wave rectification implies that half of the signal is erased.

Example 6—A System

Figure 6:
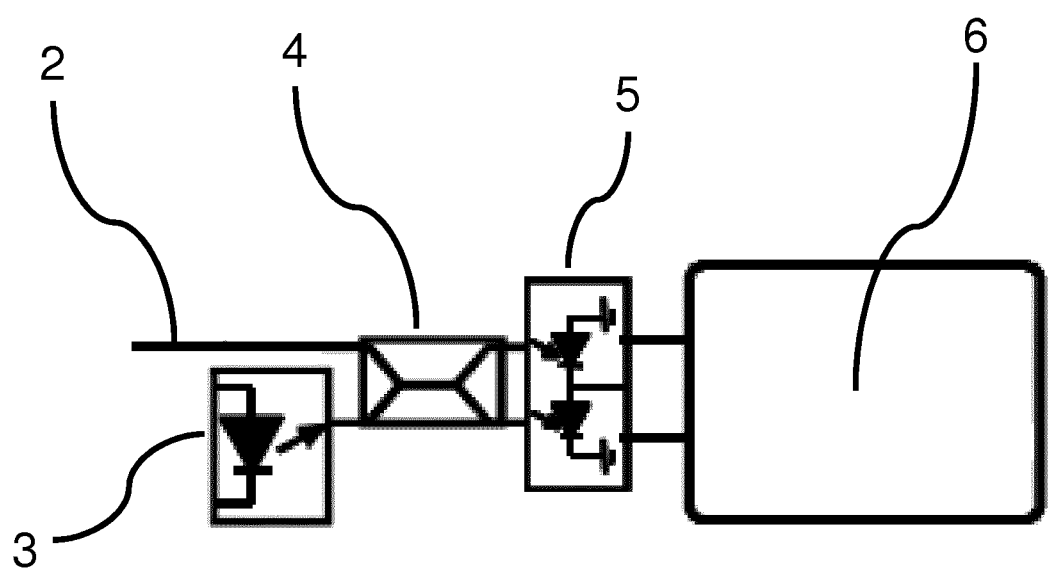
FIG. 6 shows an embodiment of the present disclosure.

FIG. 6 shows an embodiment of the present disclosure. A combined AM/FM encoded signal 2 is together with light from a local oscillator 3, combined into a coupler 4 into two electro-optical converters 5, which convert the signal into two electrical signals and passes them further into a rectifier 6, where the electrical signals are decoded.

Example 7—Detuning of Local Oscillator Using a Photodiode with the Same Bandwidth as the Bitrate of the System (Back-to-Back)

Figure 7:
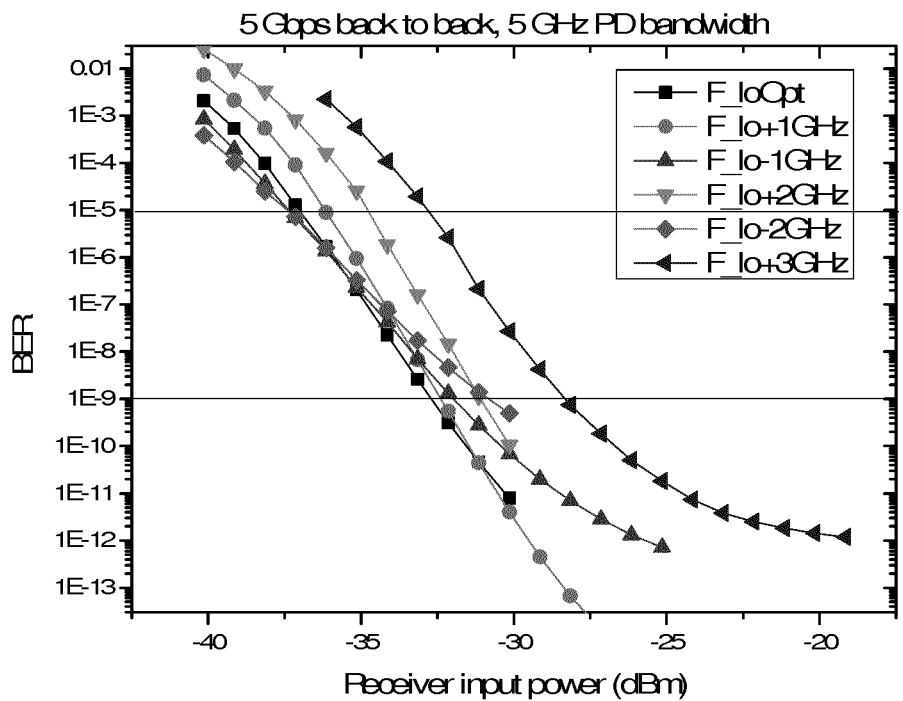
FIG. 7 shows an example of detuning of a local oscillator according to the present invention using a photodiode with the same bandwidth as the bitrate of the system (back-to-back).

FIG. 7 shows an example of how the bit error rate (BER) depends on the receiver input power for various local oscillator frequencies. The example as shown is modelled. In this example, the relationship is shown for a back-to-back. In this example, the bandwidth of the photodiode is 5 GHz, which is equal to the bitrate of the system (5 Gbps). Optimum values of the LO frequency and drive amplitude are found. The drive amplitude is fixed at this optimum, and the LO frequency is varied around its optimum value. Accordingly, the receiver sensitivity at a BER of 10e-9 can for example be found for a given detuning. This example shows that the opto-electrical converter, in this case the photodiode, has a predefined frequency bandwidth. Thus, the predefined frequency bandwidth for the photodiode is proportional to the bitrate of system, and in this example, the proportionality factor is 1.

Example 8—Detuning of Local Oscillator Using a Photodiode with a Bandwidth of 1.5 Times the Bitrate of the System (Back-to-Back)

Figure 8:
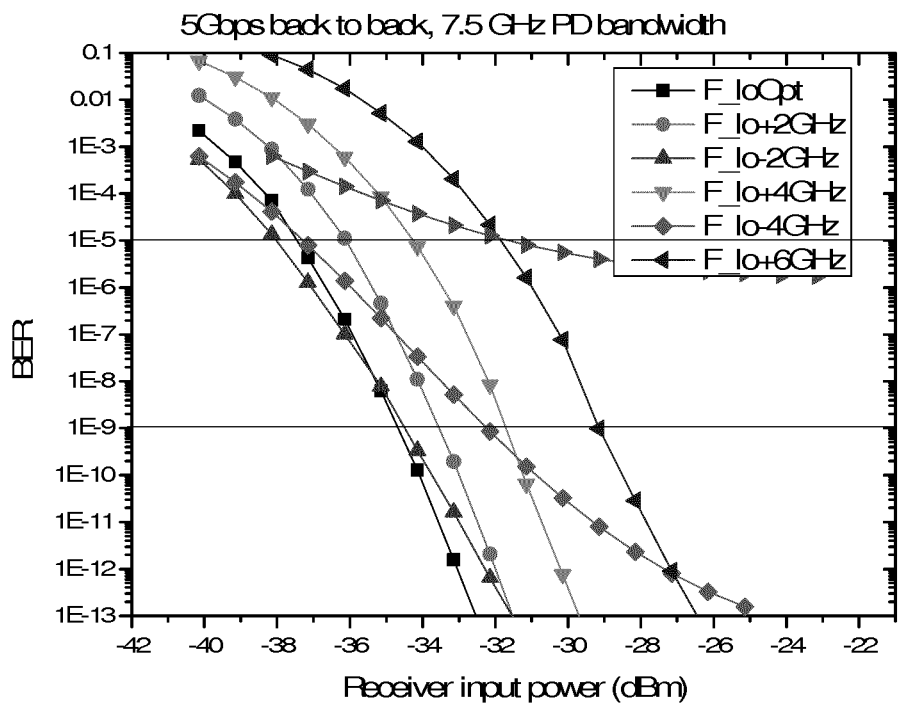
FIG. 8 shows an example of detuning of a local oscillator according to the present invention using a photodiode with a bandwidth of 1.5 times the bitrate of the system (back-to-back).

FIG. 8 shows an example of how the bit error rate (BER) depends on the receiver input power for various local oscillator frequencies. The example as shown is modelled. In this example, the relationship is shown for a back-to-back. In this example, the bandwidth of the photodiode is 7.5 GHz, which is 1.5 times the bitrate of the system (5 Gbps). Optimum values of the LO frequency and drive amplitude are found. The drive amplitude is fixed at this optimum, and the LO frequency is varied around its optimum value. Accordingly, the receiver sensitivity at a BER of 10e-9 can for example be found for a given detuning. This example shows that the opto-electrical converter, in this case the photodiode, has a predefined frequency bandwidth. Thus, the predefined frequency bandwidth for the photodiode is proportional to the bitrate of system, and in this example, the proportionality factor is 1.5.

Example 9—Detuning of Local Oscillator Using a Photodiode with the Same Bandwidth as the Bitrate of the System (100 km SSMF)

Figure 9:
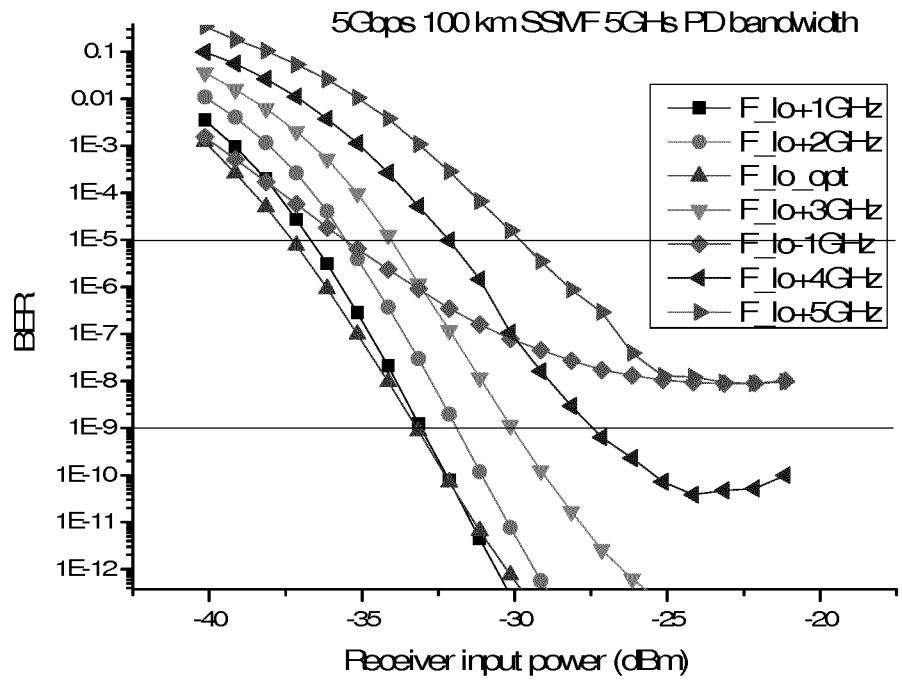
FIG. 9 shows an example of detuning of a local oscillator according to the present invention using a photodiode with same bandwidth as the bitrate of the system (100 km SSMF).

FIG. 9 shows an example of how the bit error rate (BER) depends on the receiver input power for various local oscillator frequencies. The example as shown is modelled. In this example, the relationship is shown for a back-to-back. In this example, the bandwidth of the photodiode is 5 GHz, which is equal to the bitrate of the system (5 Gbps). Optimum values of the LO frequency and drive amplitude are found. The drive amplitude is fixed at this optimum, and the LO frequency is varied around its optimum value. Accordingly, the receiver sensitivity at a BER of 10e-9 can for example be found for a given detuning. This example shows that the opto-electrical converter, in this case the photodiode, has a predefined frequency bandwidth. Thus, the predefined frequency bandwidth for the photodiode is proportional to the bitrate of system, and in this example, the proportionality factor is 1.

Example 10—Detuning of Local Oscillator Using a Photodiode with a Bandwidth of 1.5 Times the Bitrate of the System (100 km SSMF)

Figure 10:
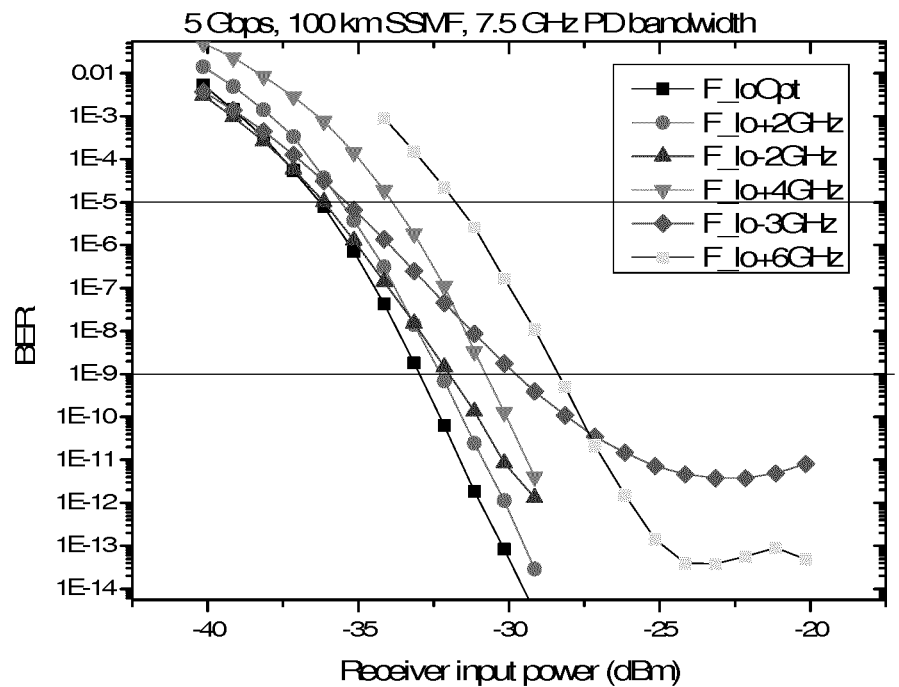
FIG. 10 shows an example of detuning of a local oscillator according to the present invention using a photodiode with a bandwidth of 1.5 times the bitrate of the system (100 km SSMF).

FIG. 10 shows an example of how the bit error rate (BER) depends on the receiver input power for various local oscillator frequencies. The example as shown is modelled. In this example, the relationship is shown for a back-to-back. In this example, the bandwidth of the photodiode is 7.5 GHz, which is 1.5 times the bitrate of the system (5 Gbps). Optimum values of the LO frequency and drive amplitude are found. The drive amplitude is fixed at this optimum, and the LO frequency is varied around its optimum value. Accordingly, the receiver sensitivity at a BER of 10e-9 can for example be found for a given detuning. This example shows that the opto-electrical converter, in this case the photodiode, has a predefined frequency bandwidth. Thus, the predefined frequency bandwidth for the photodiode is proportional to the bitrate of system, and in this example, the proportionality factor is 1.5.

Example 11—LO Detuning Penalty

Figure 11:
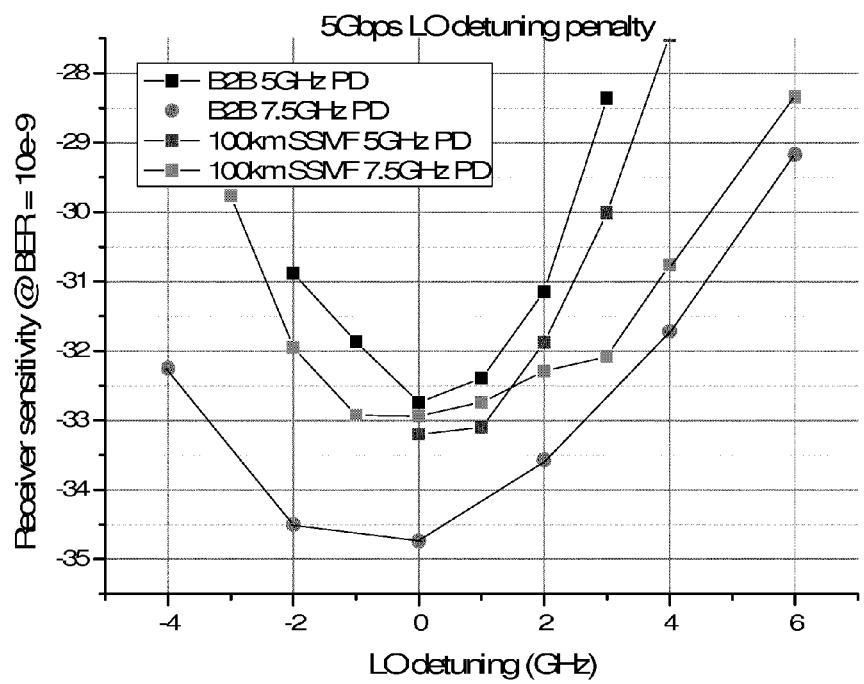
FIG. 11 shows an example of how the receiver sensitivity at a BER of 10e-9 depends on the LO detuning.

FIG. 11 shows an example of how the receiver sensitivity at a BER of 10e-9 depends on the LO detuning. The example as shown is modelled. In this example, the dependency is based on the data from FIG. 7-10. This example shows that using a photodiode with a bandwidth of 1.5 times the bit rate of the system improves receiver sensitivity. This improvement is more pronounced in the low-dispersion (back-to-back) case. Thus, this example has shown that LO detuning is increased by increasing the photodiode bandwidth. Further, dispersion shifts the LO detuning from being symmetric around the optimum LO frequency towards being more tolerant to positive than to negative detuning values. The 1-dB tolerances are listed in the table below the graph.

Example 12—Frequency Modulation (FM Shift) vs VCSEL Drive Amplitude

Figure 12:
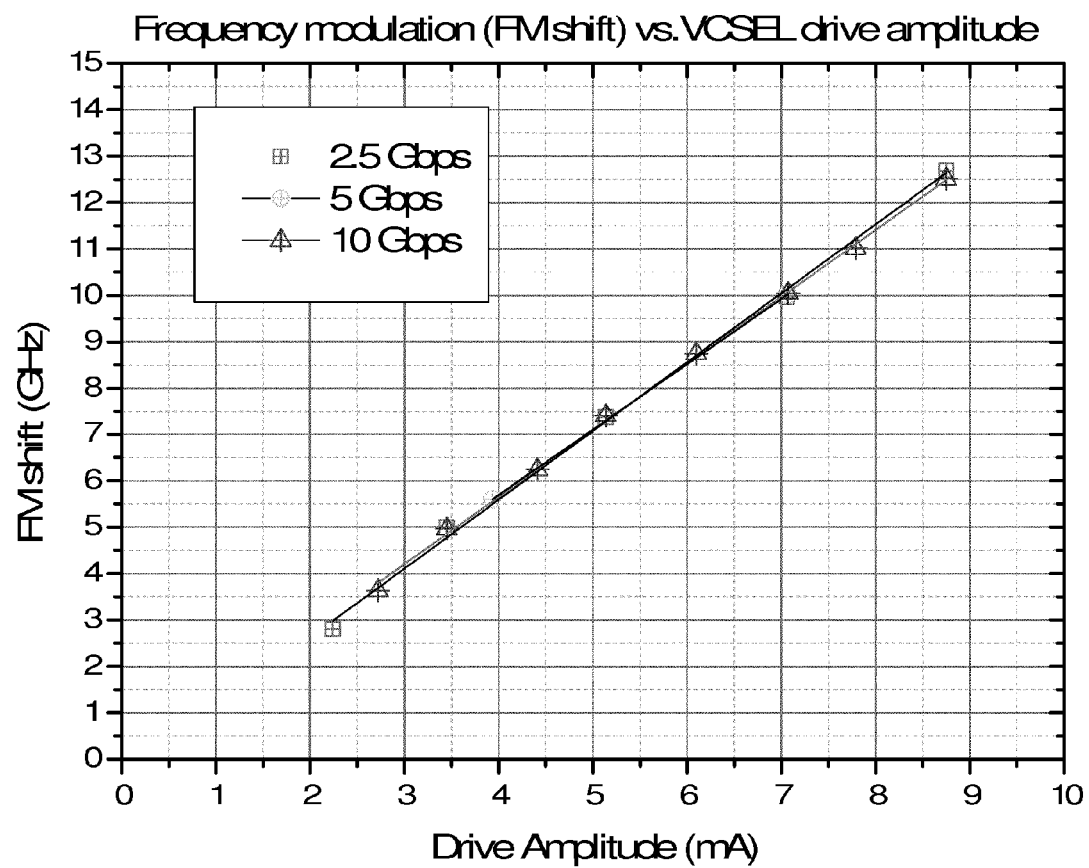
FIG. 12 shows an example of how the FM shift depends on the peak-to-peak voltage of the data signal used to drive the VCSEL.

FIG. 12 shows an example of how the FM shift depends on the peak-to-peak voltage of the data signal used to drive the VCSEL. The example as shown is modelled. As can be seen from the graph in FIG. 12, there is a linear relationship between the FM shift and the drive amplitude of the VCSEL. It has been found that the relationship is independent on the bitrate.

Example 13—AM Extinction Ratio vs VCSEL Drive Amplitude

Figure 13:
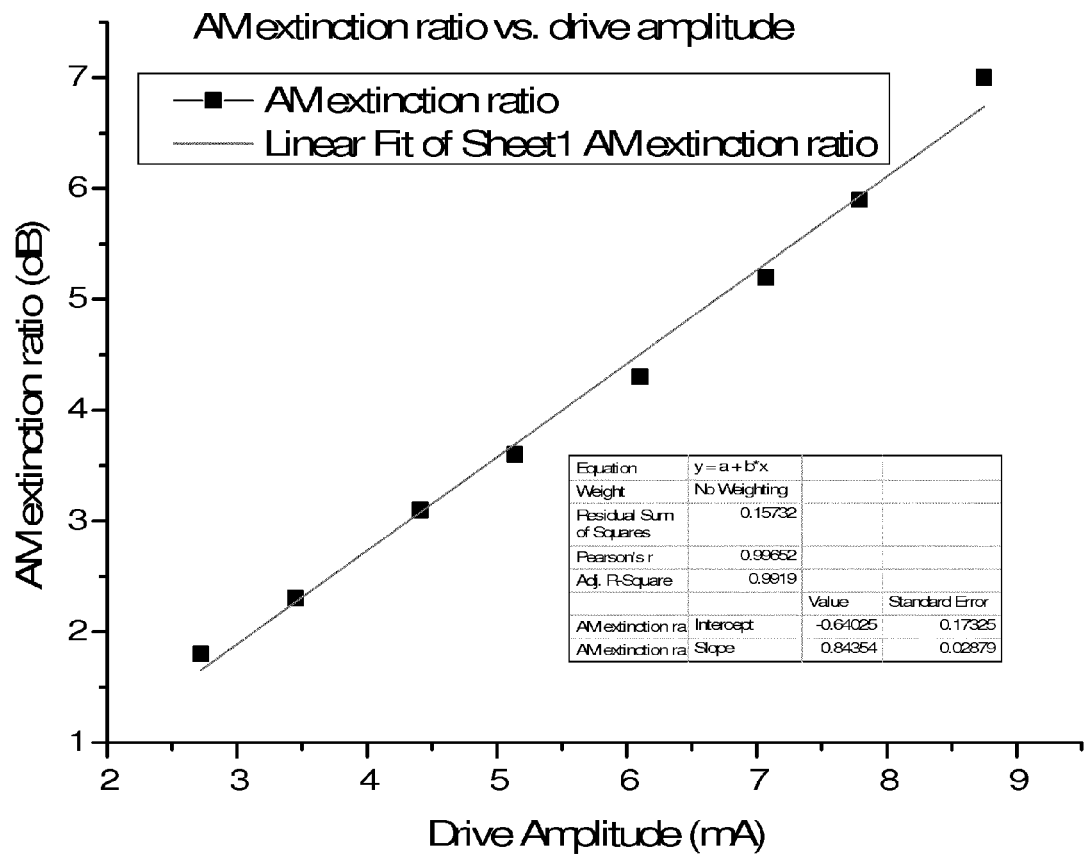
FIG. 13 shows an example of how the AM extinction ratio depends on the peak-to-peak voltage of the data signal used to drive the VCSEL.

FIG. 13 shows an example of how the AM extinction ratio depends on the peak-to-peak voltage of the data signal used to drive the VCSEL. The example as shown is modelled. As can be seen from the graph in FIG. 13, there is a linear relationship between the AM extinction ratio and the drive amplitude of the VCSEL. It has been found that the relationship is independent on the bitrate.

Example 14—Optimum FM Shift vs PD Bandwidth

Figure 14:
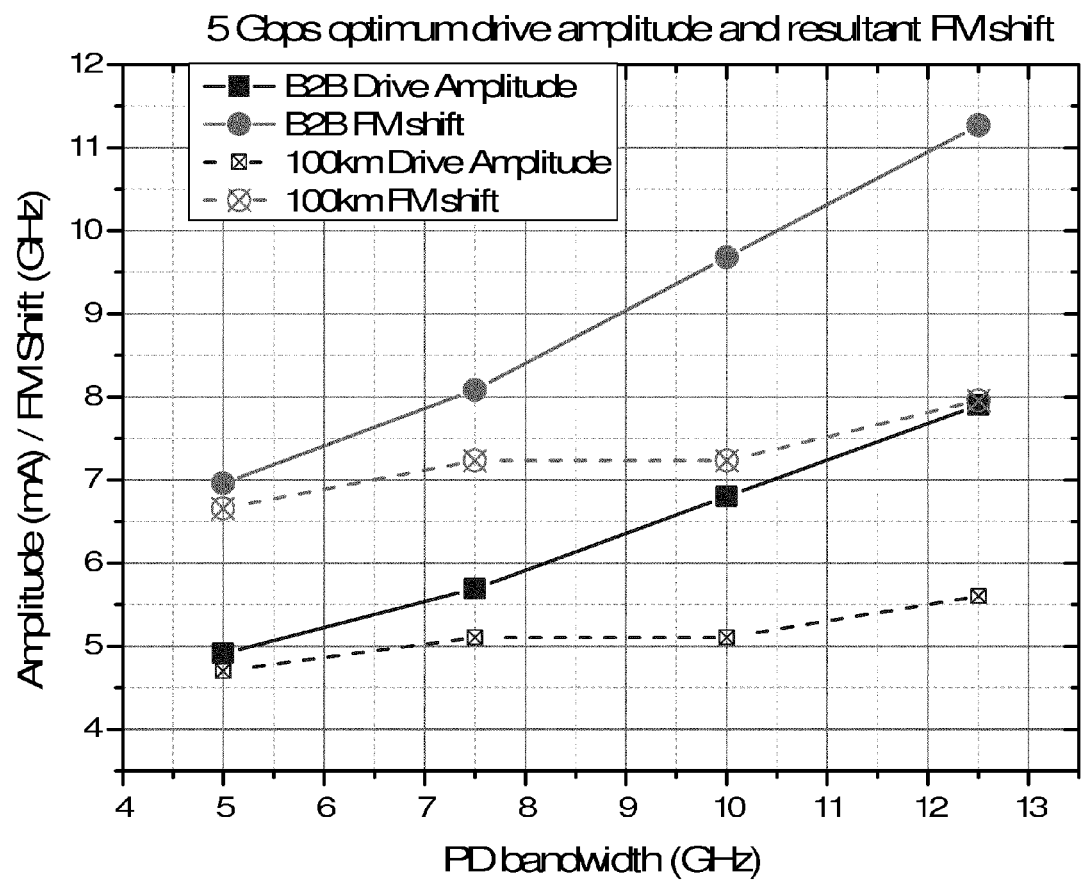
FIG. 14 shows an example of the optimum drive amplitude and resultant FM shift at 5 Gbps back-to-back and after 100 km SSMF transmission as a function of PD bandwidth.

FIG. 14 shows an example of the optimum drive amplitude and resultant FM shift at 5 Gbps back-to-back and after 100 km SSMF transmission as a function of PD bandwidth. The example as shown is modelled. It can be seen that for low dispersion (back-to-back), the optimum FM shift is almost equal to the bandwidth. For high dispersion (100 km SSMF), the optimum FM shift is almost constant with increasing PD bandwidth. The advantage of a high FM shift is countered by an increasing dispersion penalty due to the increased optical signal bandwidth for high FM shift.

Example 15—Optimum LO Frequency-Offset from 1-Level Frequency

Figure 15:
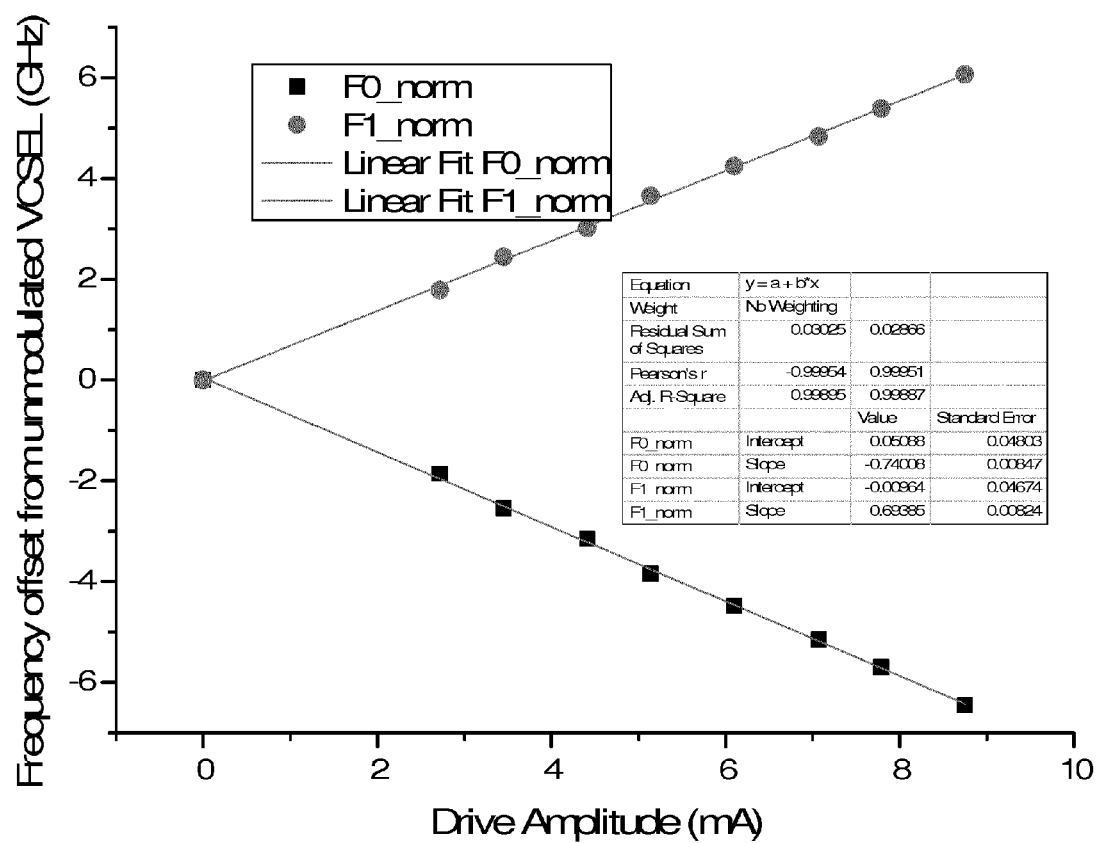
FIG. 15 shows an example of how the frequency of the zero-level (F0) and one-level (F1) depends on the drive amplitude.

FIG. 15 shown an example of how the frequency of the zero-level (F0) and one-level (F1) depends on the drive amplitude. The example as shown is modelled. The frequency is normalized to the frequency of the unmodulated VCSEL, i.e. F0=F1=0. Both F0 and F1 depend linearly on the drive amplitude. F1 moves towards higher frequencies, whereas F0 moves to lower frequencies. The center frequency in-between moves slightly towards lower frequencies. This is due the adiabatic chirp caused by the heating of the VCSEL due to the RMS power of the VCSEL drive signal. In one embodiment of the present invention, the center frequency shift is eliminated by temperature controlling VCSEL.

Example 16—Optimum LO Frequency-Offset from the Signal Center Frequency and F1 (Back-to-Back)

Figure 16:
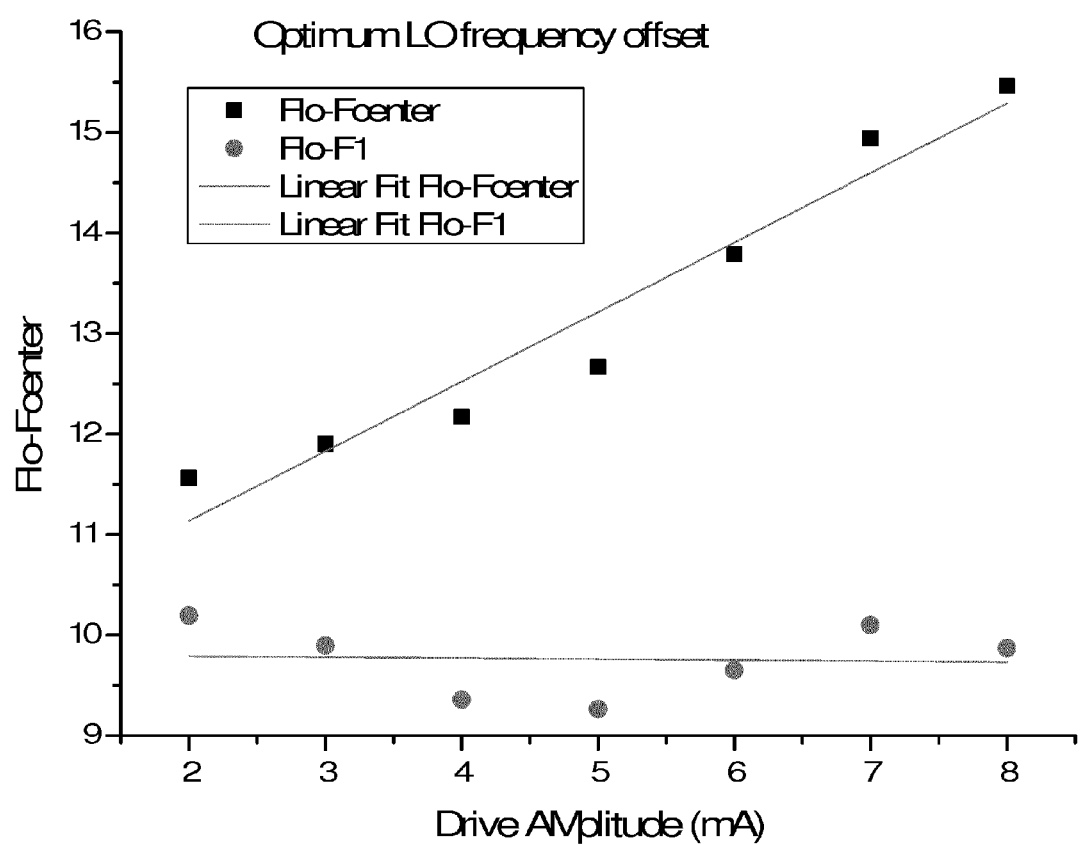
FIG. 16 shows an example of how the optimum LO frequency-offset from the signal center frequency and F1 varies with the drive amplitude for a 5 Gbps and 7.5 Ghz photodiode (back-to-back).

FIG. 16 shows an example of how the optimum LO frequency-offset from the signal center frequency and F1 varies with the drive amplitude for a 5 Gbps and 7.5 Ghz photodiode (back-to-back). The example as shown is modelled. It can be seen that the LO should be tuned to have a constant offset from F1 irrespective of the drive amplitude and thereby also independent on the FM shift.

Example 17—Optimum LO Frequency-Offset from the Signal Center Frequency and F1 (100 km SSMF)

Figure 17:
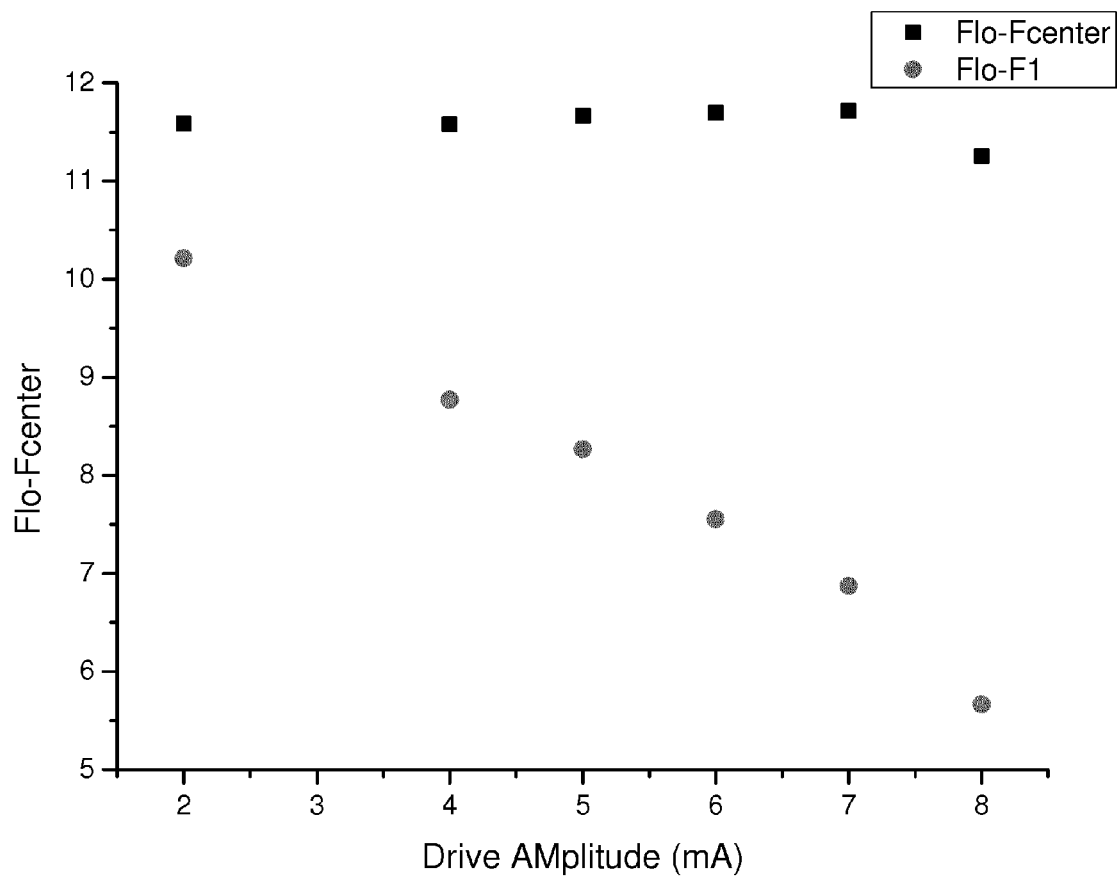
FIG. 17 shows an example of how the optimum LO frequency-offset from the signal center frequency and F1 varies with the drive amplitude for a 5 Gbps and 7.5 GHz photodiode (100 km SSMF)

FIG. 17 shows an example of how the optimum LO frequency-offset from the signal center frequency and F1 varies with the drive amplitude for a 5 Gbps and 7.5 GHz photodiode (100 km SSMF). The example as shown is modelled. It can be seen that the LO frequency is almost the same for all drive amplitudes and therefore for all values of the FM shift. In other words, this example shows the opposite of the example given in example 16. From this example, it can be seen that the optimum LO frequency is dependent dispersion.

Example 18—Optimum LO Frequency-Offset from F1 as a Function of FM Shift Using a Photodiode Bandwidth of 1.5 Times the Bitrate (Back-to-Back, 5 Gbps)

Figure 18:
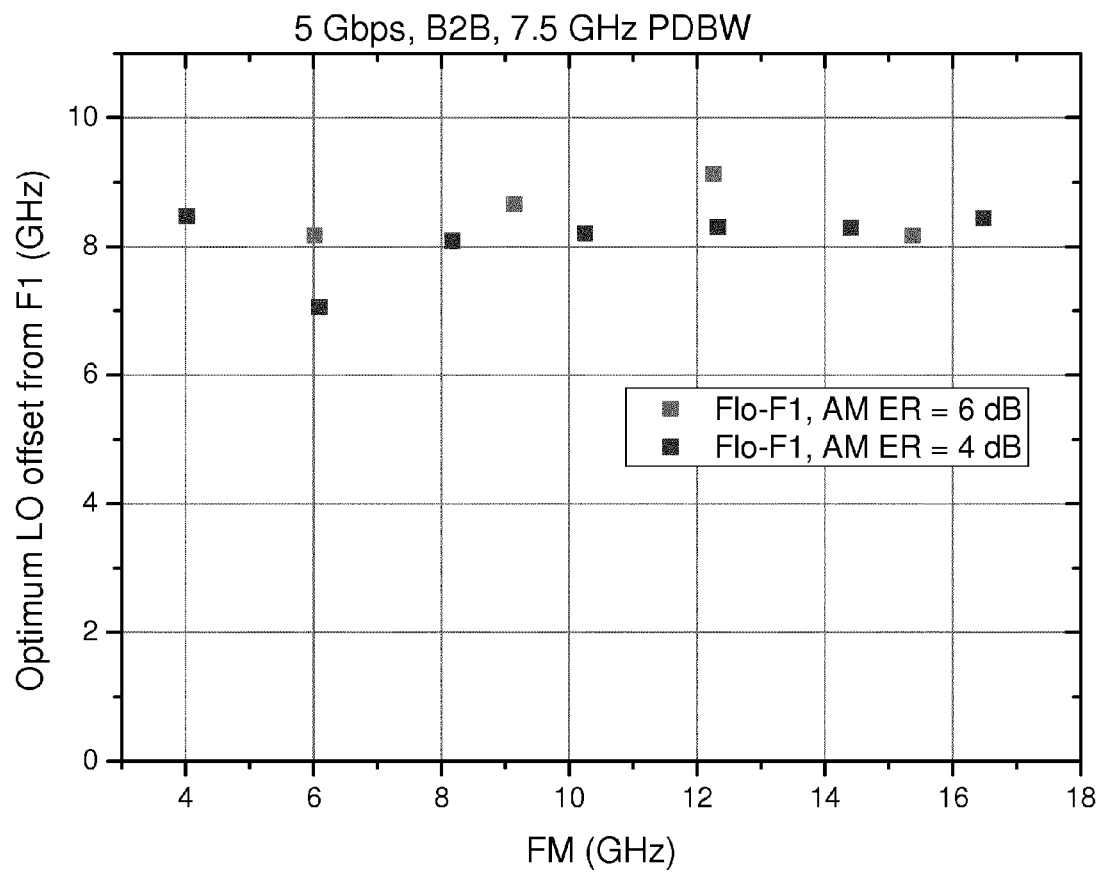
FIG. 18 shows how the optimum LO frequency-offset from F1 depends on the FM shift using a photodiode bandwidth of 1.5 times the bitrate for a back-to-back system, 5 Gbps.

FIG. 18 shows how the optimum LO frequency-offset from F1 depends on the FM shift using a photodiode bandwidth of 1.5 times the bitrate for a back-to-back system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 7.5 GHz, and the offset is between 7-9 GHz. Thus, in this example, the offset is selected to be between 0.9 and 1.2 times the bandwidth of the opto-electrical converter. From this example, it can be seen that optimum LO frequency-offset varies little with the FM shift. In other words, the offset is varying little in the range between approximately 1 and 1.5 times the bandwidth of the opto-electrical converter. In this example, it has been shown that for low dispersion, the optimum LO frequency-offset is independent of the AM extinction ration.

Example 19—Optimum LO Frequency-Offset from F1 as a Function of FM Shift Using a Photodiode Bandwidth of 2 Times the Bitrate (Back-to-Back, 5 Gbps)

Figure 19:
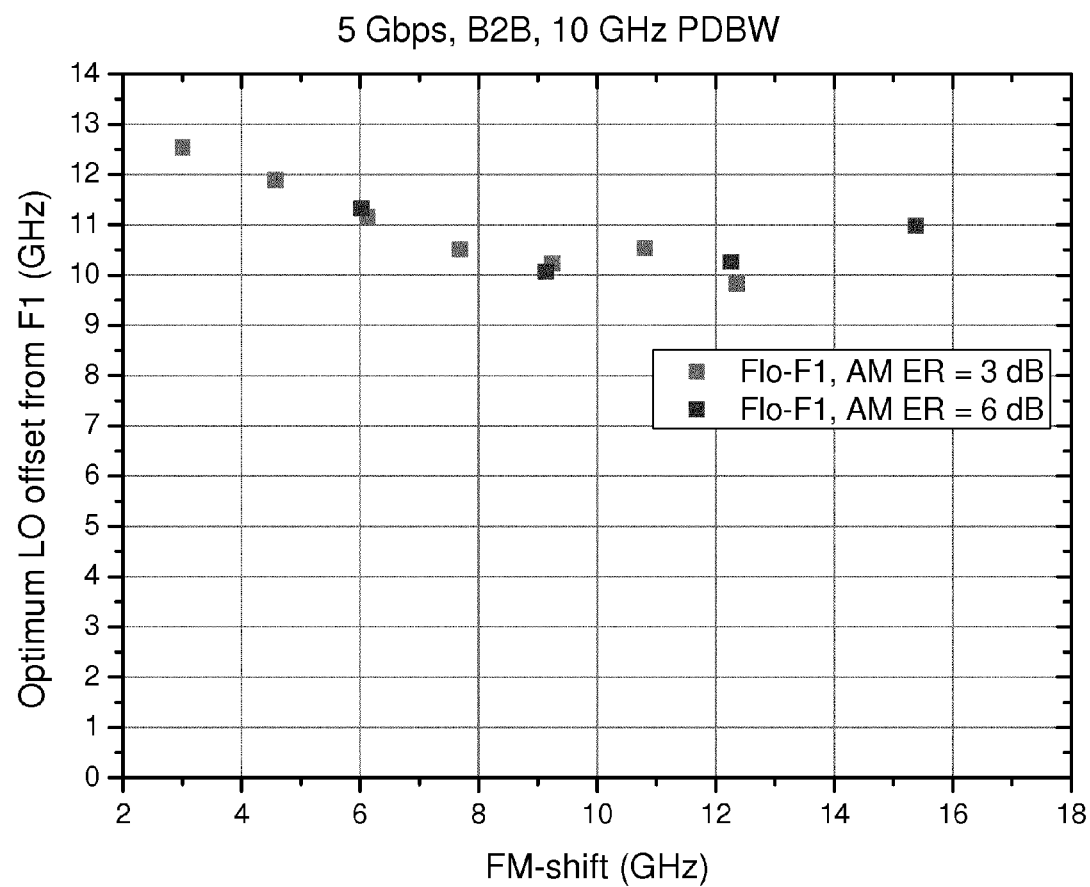
FIG. 19 shows how the optimum LO frequency-offset from F1 depends on the FM shift using a photodiode bandwidth of 2 times the bitrate for a back-to-back system, 5 Gbps.

FIG. 19 shows how the optimum LO frequency-offset from F1 depends on the FM shift using a photodiode bandwidth of 2 times the bitrate for a back-to-back system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 10 GHz, and the offset is between 9.5-12.5 GHz. Thus, in this example, the offset is selected to be between 0.95 and 1.25 times the bandwidth of the opto-electrical converter. From this example, it can be seen that optimum LO frequency-offset varies little with the FM shift. In other words, the offset is varying little in the range between approximately 1 and 1.5 times the bandwidth of the opto-electrical converter. In this example, it has been shown that for low dispersion, the optimum LO frequency-offset is independent of the AM extinction ration.

Example 20—Optimum LO Frequency-Offset from F1 as a Function of FM Shift Using a Photodiode Bandwidth of 1.5 Times the Bitrate (40 km SSMF, 5 Gbps)

Figure 20:
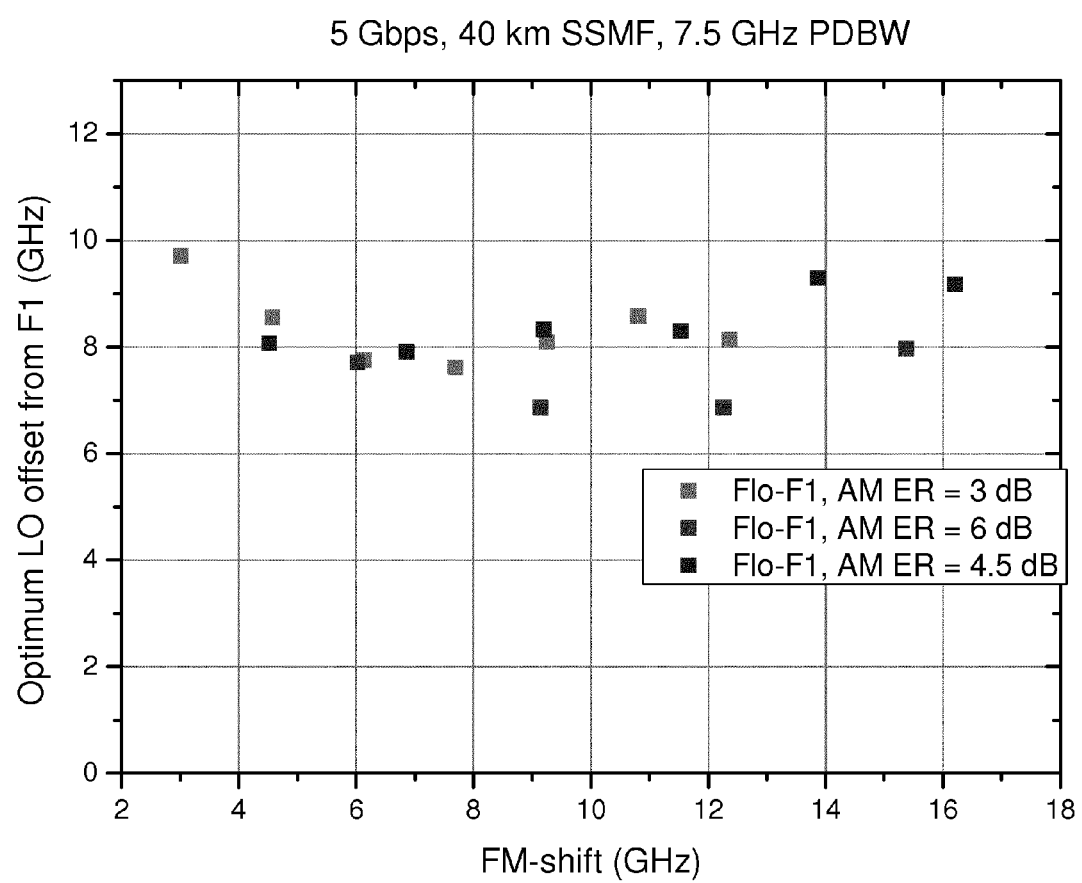
FIG. 20 shows how the optimum LO frequency-offset from F1 depends on the FM shift using a photodiode bandwidth of 1.5 times the bitrate for a 40 km SSMF system, 5 Gbps.

FIG. 20 shows how the optimum LO frequency-offset from F1 depends on the FM shift using a photodiode bandwidth of 1.5 times the bitrate for a 40 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 7.5 GHz, and the offset is between ca. 7-10 GHz. Thus, in this example, the offset is selected to be between 0.9 and 1.35 times the bandwidth of the opto-electrical converter. From this example, it can be seen that optimum LO frequency-offset varies little with the FM shift. In other words, the offset is varying little in the range between approximately 1 and 1.5 times the bandwidth of the opto-electrical converter. In this example, it has been shown that for relatively low dispersion, the optimum LO frequency-offset is independent of the AM extinction ration.

Example 21—Optimum LO Frequency-Offset from F1 as a Function of FM Shift Using a Photodiode Bandwidth of 2 Times the Bitrate (40 km SSMF, 5 Gbps)

Figure 21:
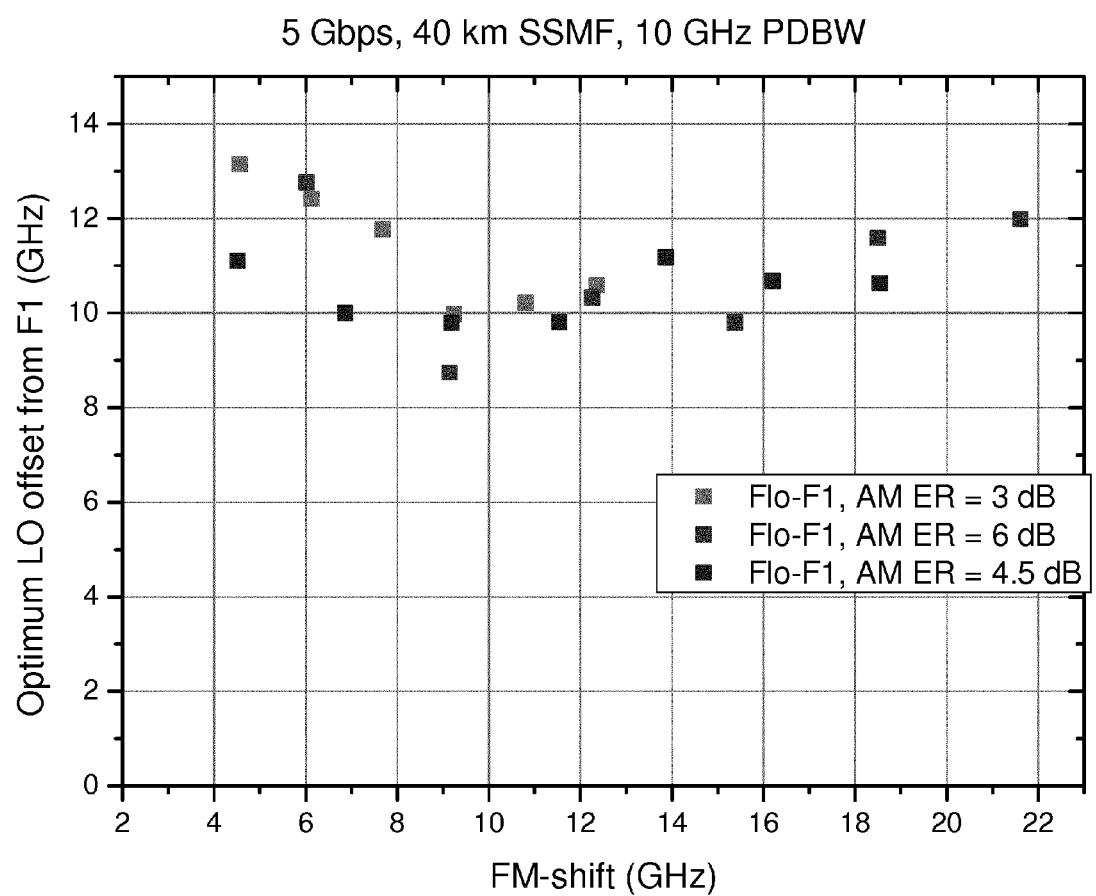
FIG. 21 shows how the optimum LO frequency-offset from F1 depends on the FM shift using a photodiode bandwidth of 2 times the bitrate for a 40 km SSMF system, 5 Gbps.

FIG. 21 shows how the optimum LO frequency-offset from F1 depends on the FM shift using a photodiode bandwidth of 2 times the bitrate for a 40 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 10 GHz, and the offset is between ca. 9-13 GHz. Thus, in this example, the offset is selected to be between 0.9 and 1.3 times the bandwidth of the opto-electrical converter. From this example, it can be seen that optimum LO frequency-offset varies little with the FM shift. In other words, the offset is varying little in the range between approximately 1 and 1.5 times the bandwidth of the opto-electrical converter. In this example, it has been shown that for relatively low dispersion, the optimum LO frequency-offset is independent of the AM extinction ration.

Example 22—Optimum LO Frequency-Offset from F1 as a Function of FM Shift Using a Photodiode Bandwidth of 1.5 Times the Bitrate (80 km SSMF, 5 Gbps)

Figure 22:
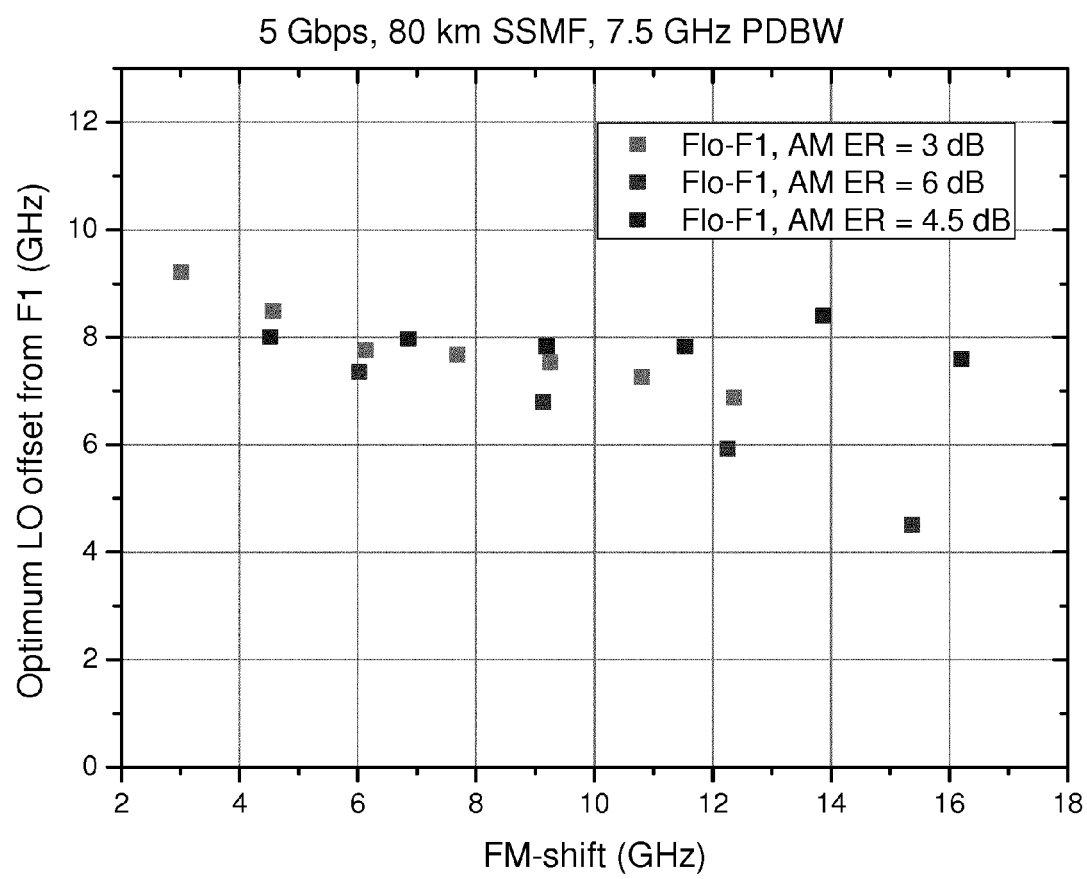
FIG. 22 shows how the optimum LO frequency-offset from F1 depends on the FM shift using a photodiode bandwidth of 1.5 times the bitrate for a 80 km SSMF system, 5 Gbps.

FIG. 22 shows how the optimum LO frequency-offset from F1 depends on the FM shift using a photodiode bandwidth of 1.5 times the bitrate for a 80 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 7.5 GHz, and the offset is between ca. 5-9 GHz.

Thus, in this example, the offset is selected to be between 0.6 and 1.2 times the bandwidth of the opto-electrical converter. From this example, it can be seen that optimum LO frequency-offset varies little with the FM shift. In other words, the offset is in this example varying little in the range between approximately 0.5 and 1.5 times the bandwidth of the opto-electrical converter.

Example 23—Optimum LO Frequency-Offset from F1 as a Function of FM Shift Using a Photodiode Bandwidth of 2 Times the Bitrate (80 km SSMF, 5 Gbps)

Figure 23:
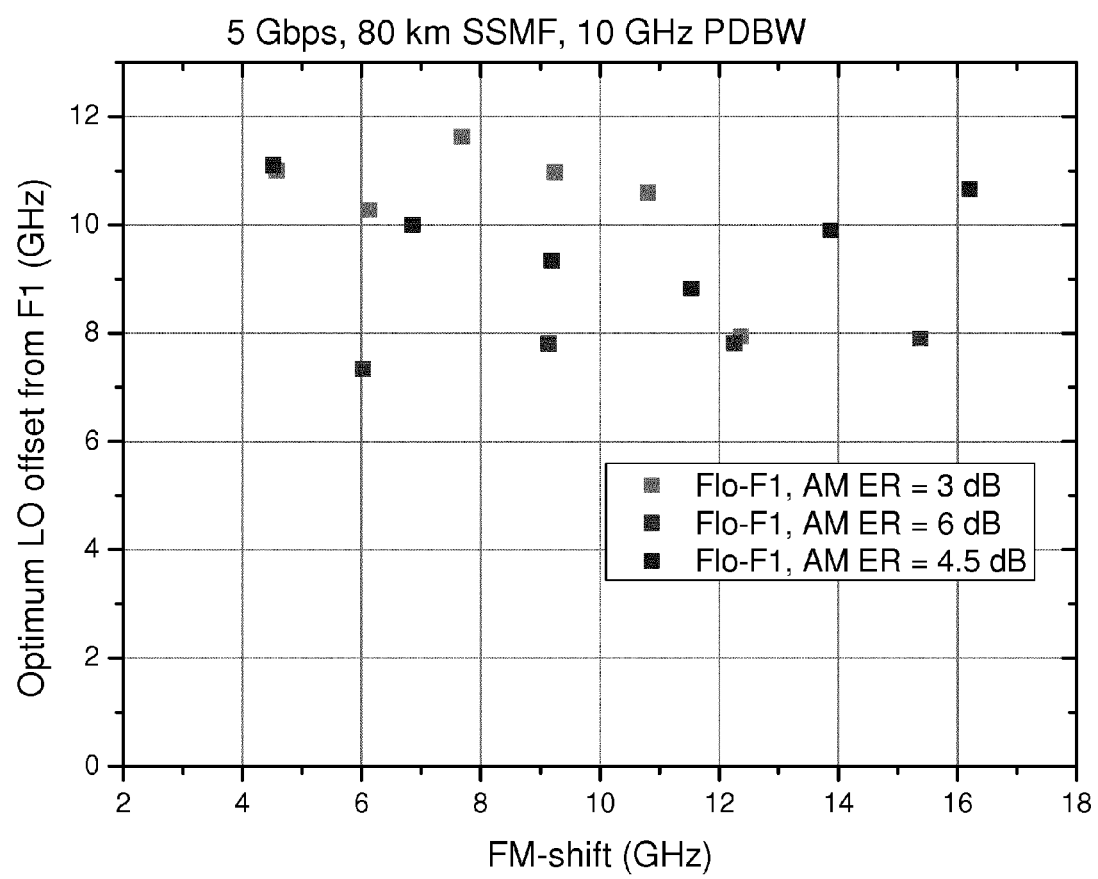
FIG. 23 shows how the optimum LO frequency-offset from F1 depends on the FM shift using a photodiode bandwidth of 2 times the bitrate for a 80 km SSMF system, 5 Gbps.

FIG. 23 shows how the optimum LO frequency-offset from F1 depends on the FM shift using a photodiode bandwidth of 2 times the bitrate for a 80 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 10 GHz, and the offset is between ca. 7-12 GHz. Thus, in this example, the offset is selected to be between 0.7 and 1.2 times the bandwidth of the opto-electrical converter. From this example, it can be seen that optimum LO frequency-offset varies little with the FM shift. In other words, the offset is in this example varying little in the range between approximately 0.5 and 1.5 times the bandwidth of the opto-electrical converter.

Example 24—Optimum LO Frequency-Offset from F1 as a Function of FM Shift Using a Photodiode Bandwidth of 1.5 Times the Bitrate (Back-to-Back, 10 Gbps)

Figure 24:
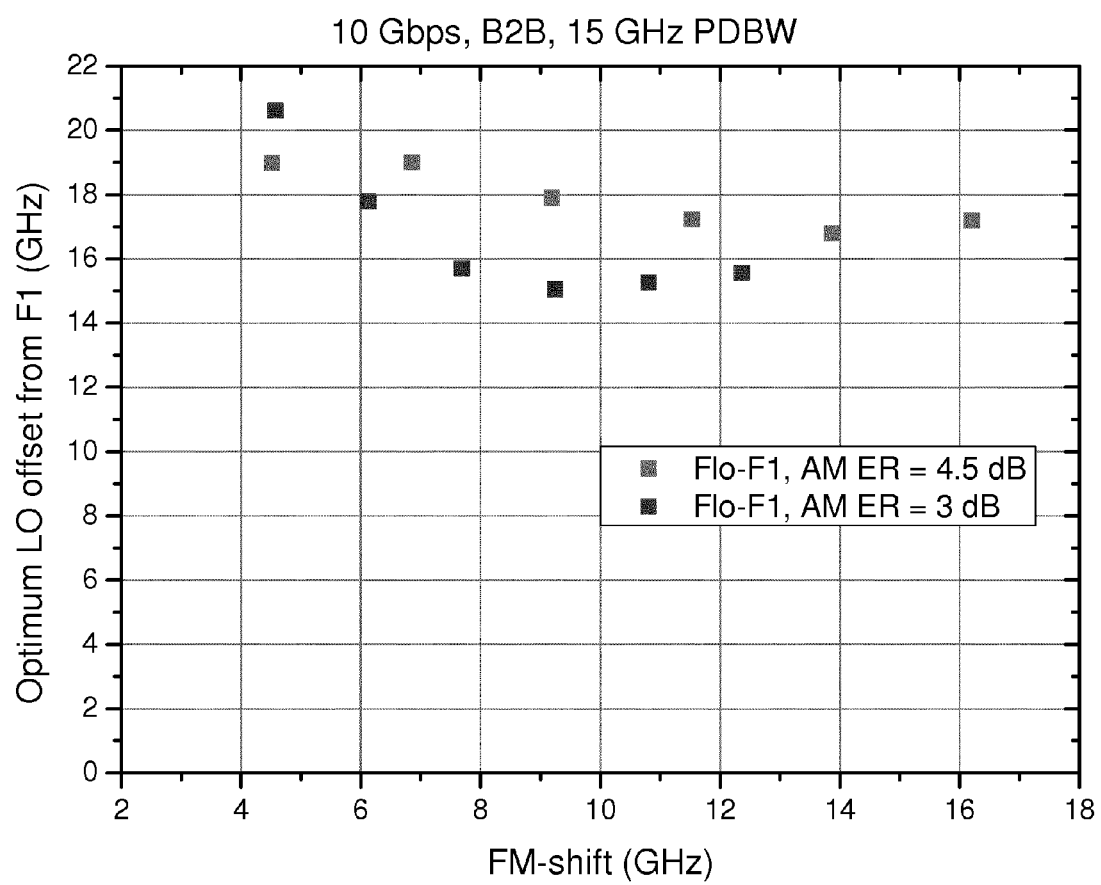
FIG. 24 shows how the optimum LO frequency-offset from F1 depends on the FM shift using a photodiode bandwidth of 1.5 times the bitrate for a back-to-back system, 10 Gbps.

FIG. 24 shows how the optimum LO frequency-offset from F1 depends on the FM shift using a photodiode bandwidth of 1.5 times the bitrate for a back-to-back system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 15 GHz, and the offset is between ca. 15-21 GHz. Thus, in this example, the offset is selected to be between 1 and 1.4 times the bandwidth of the opto-electrical converter. From this example, it can be seen that optimum LO frequency-offset varies little with the FM shift. In other words, the offset is in this example varying little in the range between 1 and 1.5 times the bandwidth of the opto-electrical converter.

Example 25—Optimum LO Frequency-Offset from F1 as a Function of FM Shift Using a Photodiode Bandwidth of 2 Times the Bitrate (Back-to-Back, 10 Gbps)

Figure 25:
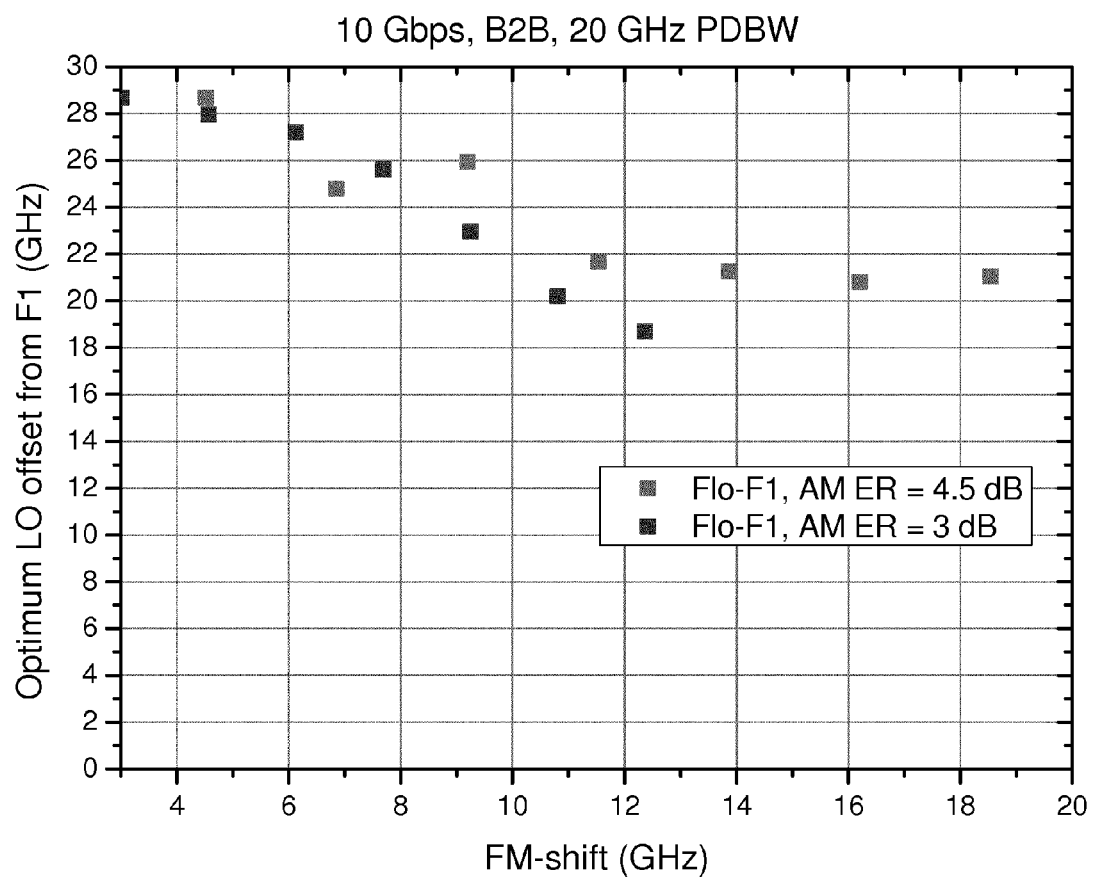
FIG. 25 shows how the optimum LO frequency-offset from F1 depends on the FM shift using a photodiode bandwidth of 2 times the bitrate for a back-to-back system, 10 Gbps.

FIG. 25 shows how the optimum LO frequency-offset from F1 depends on the FM shift using a photodiode bandwidth of 2 times the bitrate for a back-to-back system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 20 GHz, and the offset is between ca. 18-29 GHz. Thus, in this example, the offset is selected to be between 0.9 and 1.5 times the bandwidth of the opto-electrical converter. From this example, it can be seen that optimum LO frequency-offset varies little with the FM shift. In other words, the offset is in this example varying little in the range between approximately 1 and 1.5 times the bandwidth of the opto-electrical converter.

Example 26—Optimum LO Frequency-Offset from F1 as a Function of FM Shift Using a Photodiode Bandwidth of 1.5 Times the Bitrate (40 km SSMF, 10 Gbps)

Figure 26:
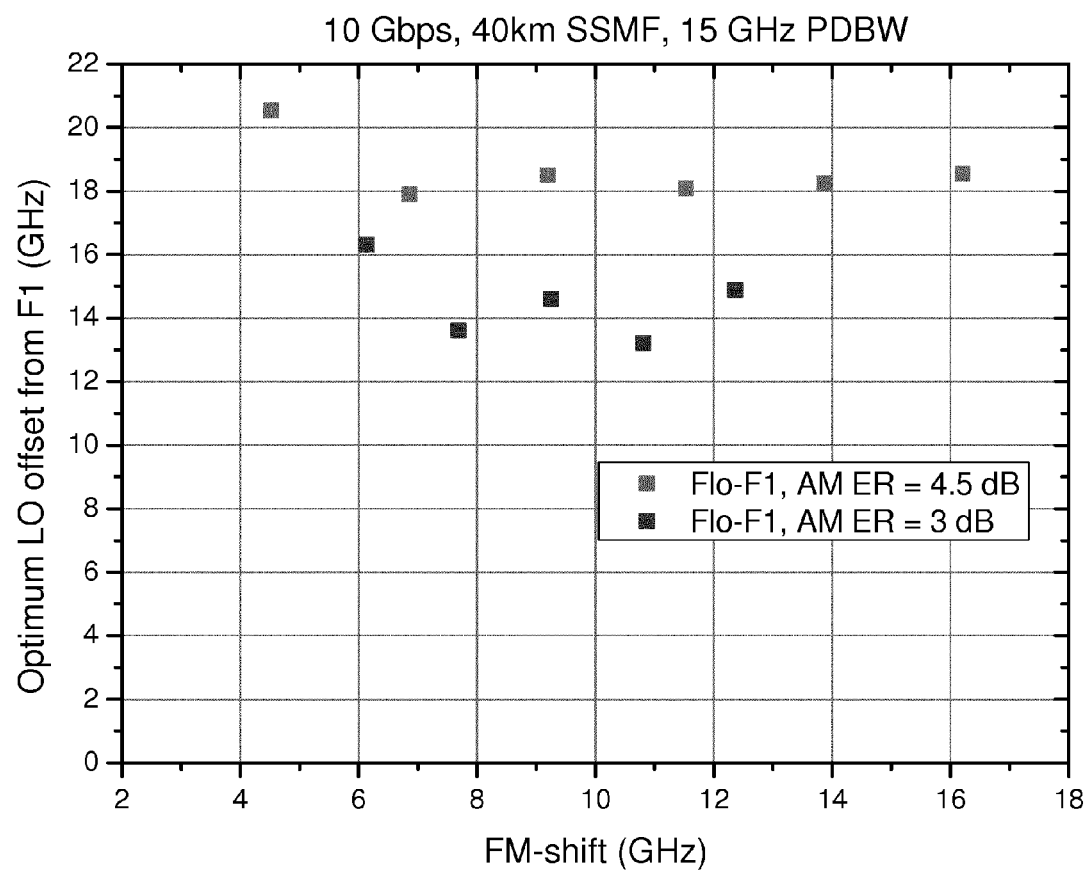
FIG. 26 shows how the optimum LO frequency-offset from F1 depends on the FM shift using a photodiode bandwidth of 1.5 times the bitrate for a 40 km SSMF system, 10 Gbps.

FIG. 26 shows how the optimum LO frequency-offset from F1 depends on the FM shift using a photodiode bandwidth of 1.5 times the bitrate for a 40 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 15 GHz, and the offset is between ca. 13-21 GHz. Thus, in this example, the offset is selected to be between roughly 0.9 and 1.4 times the bandwidth of the opto-electrical converter. From this example, it can be seen that optimum LO frequency-offset varies little with the FM shift. In other words, the offset is in this example varying little in the range between approximately 1 and 1.5 times the bandwidth of the opto-electrical converter.

Example 27—Optimum LO Frequency-Offset from F1 as a Function of FM Shift Using a Photodiode Bandwidth of 2 Times the Bitrate (40 km SSMF, 10 Gbps)

Figure 27:
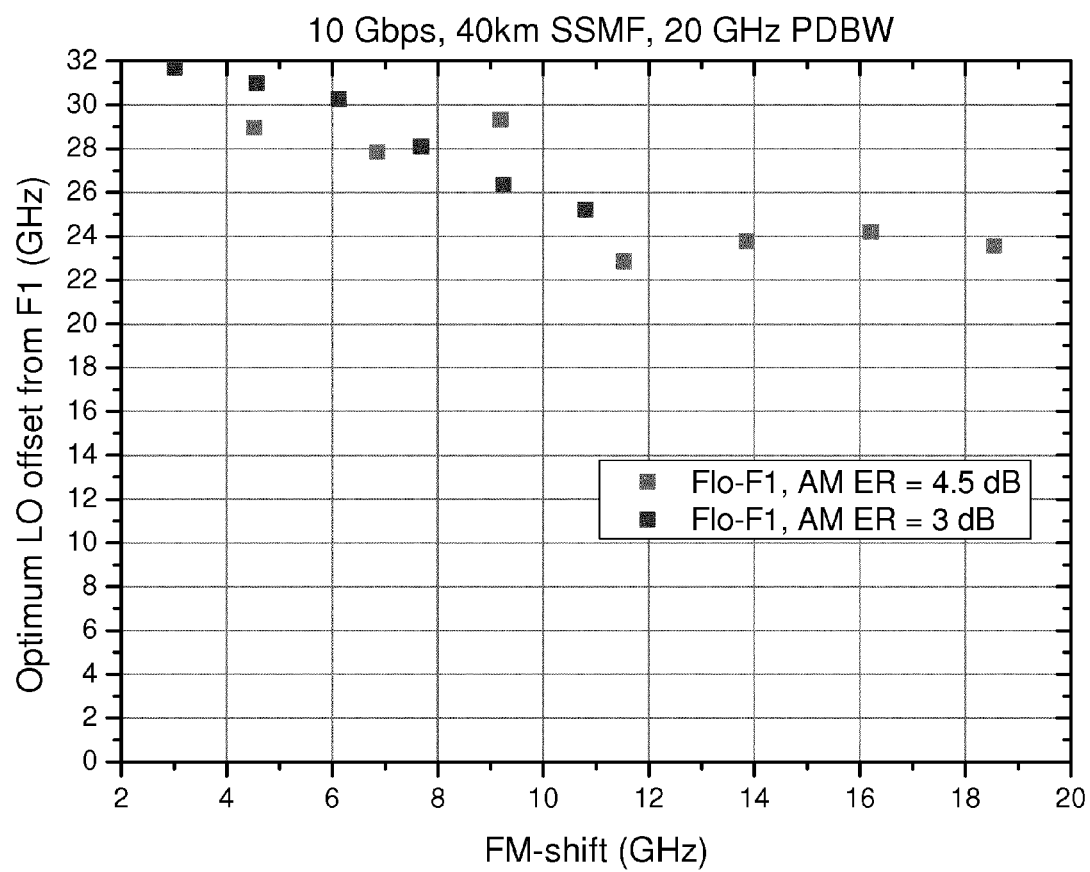
FIG. 27 shows how the optimum LO frequency-offset from F1 depends on the FM shift using a photodiode bandwidth of 2 times the bitrate for a 40 km SSMF system, 10 Gbps.

FIG. 27 shows how the optimum LO frequency-offset from F1 depends on the FM shift using a photodiode bandwidth of 2 times the bitrate for a 40 km SSMF system. The example as shown is modelled. Results for different fixed AM extinction ratios are also included in the modelled results. Thus, in this example, it is shown that the frequency of the local oscillator is selected to have a predefined offset from, preferably higher than, the frequency of one of the states in the encoded optical signal, preferably the state with the highest amplitude. It is further shown that the offset is dependent on the bandwidth of the opto-electrical converter. In this example, the bandwidth of the opto-electrical converter is 20 GHz, and the offset is between ca. 22-32 GHz. Thus, in this example, the offset is selected to be between roughly 1.1 and 1.6 times the bandwidth of the opto-electrical converter. From this example, it can be seen that optimum LO frequency-offset varies little with the FM shift.

In other words, the offset is in this example varying little in the range between approximately 1 and 1.6 times the bandwidth of the opto-electrical converter.

Example 28—Optimum FM Shift as a Function of Photo-Detector Bandwidth and Transmission Distance (5 Gbps)

Figure 28:
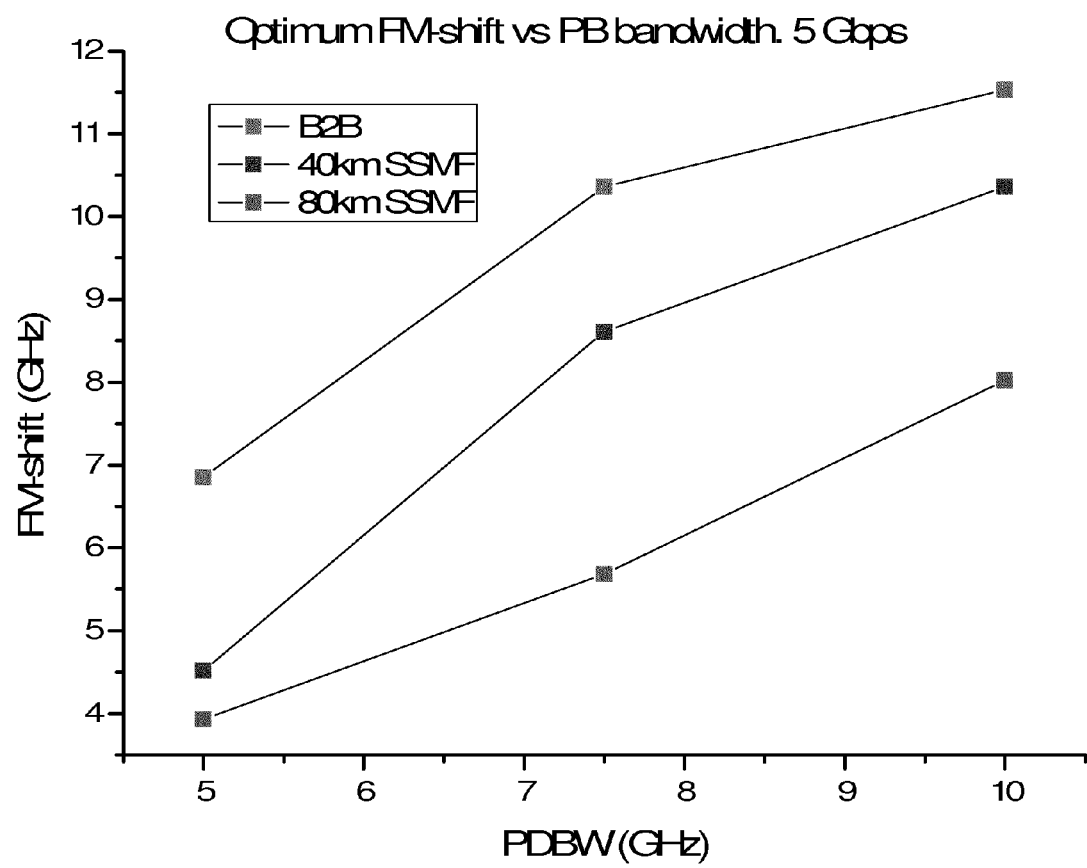
FIG. 28 shows an example of how the optimum FM shift depends on the photo-detector bandwidth and transmission distance for 5 Gbps systems.

FIG. 28 shows an example of how the optimum FM shift depends on the photo-detector bandwidth and transmission distance for 5 Gbps systems. From this example it can be seen that the frequency modulation is configured such that the frequency separation between the states in the optical signal is dependent on the frequency bandwidth of the opto-electrical converter, in particular the frequency modulation is configured such that the frequency separation between the states in the optical signal is proportional with a proportionality factor to the frequency bandwidth of the opto-electrical converter. For the back-to-back system, the proportionality factor is approximately 1.2, whereas for a 40 km SSMF system, the proportionality factor is approximately 1 and for a 80 km SSMF system, the proportionality factor is approximately 0.8. Thus, it can be seen that dispersion decreases the optimum FM-shift.

Example 29—Optimum FM Shift as a Function of Photo-Detector Bandwidth and Transmission Distance (10 Gbps)

Figure 29:
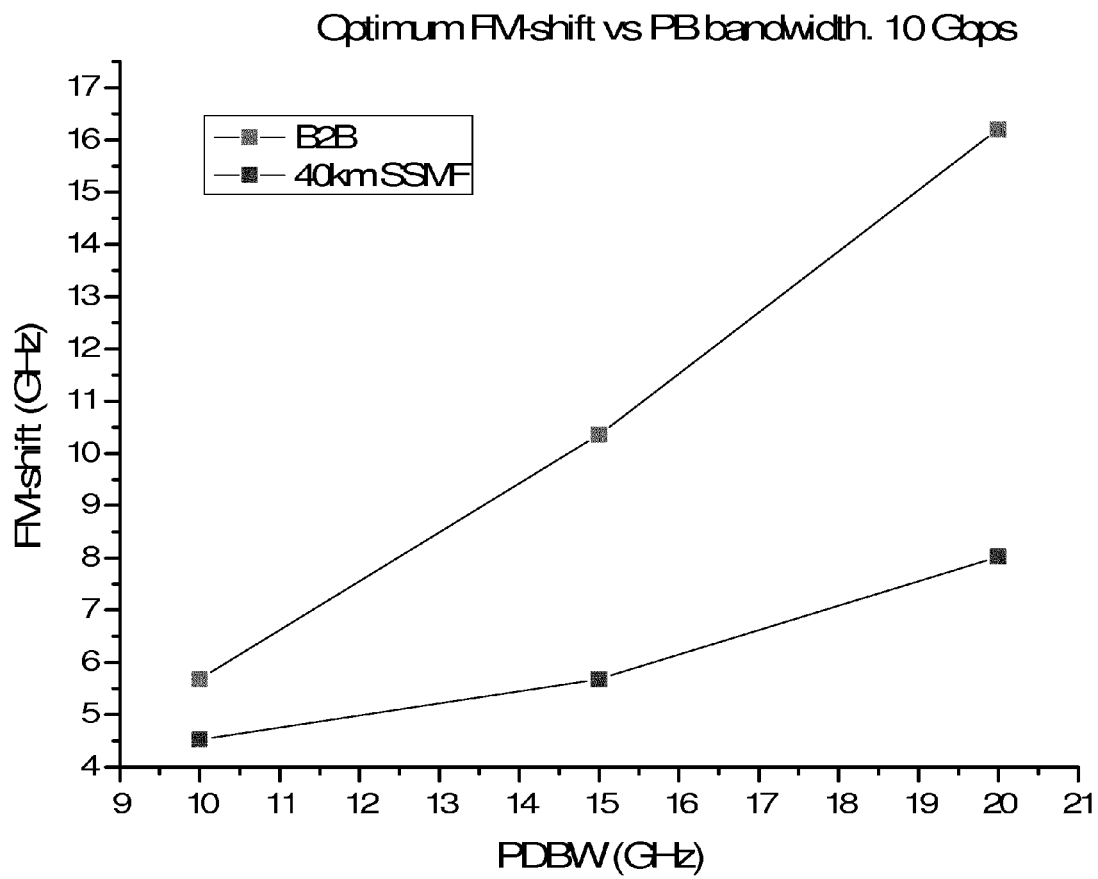
FIG. 29 shows an example of how the optimum FM shift depends on the photo-detector bandwidth and transmission distance for 10 Gbps systems.

FIG. 29 shows an example of how the optimum FM shift depends on the photo-detector bandwidth and transmission distance for 10 Gbps systems. From this example it can be seen that the frequency modulation is configured such that the frequency separation between the states in the optical signal is dependent on the frequency bandwidth of the opto-electrical converter, in particular the frequency modulation is configured such that the frequency separation between the states in the optical signal is proportional with a proportionality factor to the frequency bandwidth of the opto-electrical converter. For the back-to-back system, the proportionality factor is approximately 0.8, whereas for a 40 km SSMF system, the proportionality factor is approximately 0.4. Thus, it can be seen that dispersion decreases the optimum FM-shift. Further, a higher photo-detector bandwidth increases the optimum FM shift.

The invention claimed is:

1. A method for decoding an encoded optical signal comprising at least two different states, such as "0"-states and "1"-states, the optical signal being frequency and amplitude modulated such that the different states are separated in frequency and amplitude, the method comprising the steps of:
combining said encoded optical signal with light from a local oscillator configured with a local oscillator frequency;
converting the combined local oscillator and encoded optical signal into one or more electrical signals by means of at least one opto-electrical converter having a predefined frequency bandwidth, thereby providing an amplified and encoded electrical signal having one or more encoded signal current(s), where one type of states have a higher oscillation frequency than other type of states;
rectifying the encoded signal current(s), thereby obtaining an encoded power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal; wherein said local oscillator frequency-offset is selected to be between 1 and 1.5 times the predefined frequency bandwidth of the opto-electrical converter.

2. The method according to claim 1, wherein said power spectrum is filtered by a low pass filter, thereby reducing the residual power of one type of states relative to another type of state.

3. The method according to claim 1, wherein said power spectrum is applied with threshold detection, such that different states, such as "0"-states and "1"-states, are automatically detected.

4. The method according to claim 1, wherein said one of the states is a state with the highest amplitude.

5. The method according to claim 1, wherein said local oscillator is operating without a phase locked loop.

6. The method according to claim 1, wherein said local oscillator frequency-offset is greater than the bandwidth of the opto-electrical converter.

7. The method according to claim 1, wherein said local oscillator frequency-offset is selected to be approx. 1.2 times the bandwidth of the opto-electrical converter.

8. A method for transmitting an optical signal, comprising the steps of:
encoding the optical signal by amplitude and frequency modulation, and
decoding the combined AM and FM signal according to claim 1, and wherein said encoding or decoding of a combined AM and FM signal is using two or more levels.

9. The method according to claim 8, wherein said signal is encoded by one or more simultaneous AM and FM devices, such as a frequency chirped laser, in particular a DML or a VCSEL.

10. The method according to claim 8, wherein said signal is encoded by one or more separate AM device(s) and one or more separate FM device(s).

11. The method according to claim 8, wherein said optical signal is configured with an AM extinction ratio between 3 dB and 6 dB.

12. The method according to claim 8, wherein said frequency modulation is configured such that the frequency separation between the states in the optical signal is less than 15 GHz, or less than 14 GHz, or less than 13 GHz, or less than 12 GHz, or less than 11 GHz, or less than 10 GHz.

13. The method according to claim 8, wherein said frequency modulation is configured such that the frequency separation between the states in the optical signal is dependent on the frequency bandwidth of the opto-electrical converter.

14. The method according to claim 8, wherein said frequency modulation is configured such that the frequency separation between the states in the optical signal is proportional with a proportionality factor to the frequency bandwidth of the opto-electrical converter.

15. The method according to claim 14, wherein said proportionality factor is between 0.2 and 1.4.

16. A detector system for decoding a combined AM and FM encoded optical signal comprising at least two different types of states, such as "0"-states and "1"-states, comprising:
a local oscillator configured with a local oscillator frequency;
a coupling device configured for coupling the encoded optical signal with light from the local oscillator;

one or more opto-electrical converter(s) having a predefined frequency bandwidth, configured for providing an amplified and encoded electrical signal having one or more encoded signal current(s) where one type of states have a higher oscillation frequency than another type of states;

a rectifier configured for rectification of said signal current(s) to provide a power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal, wherein said local oscillator frequency-offset is selected to be between 1 and 1.5 times the predefined frequency bandwidth of the opto-electrical converter.

17. The detector system according to claim 16, further comprising a low pass filter configured for reducing the residual power of one type of states relatively to another type of state, such that "0"-states and "1"-states, with different power levels can be discriminated more easily.

18. The detector system according to claim 16, further comprising a threshold detection module configured for threshold detection of said power spectrum, such that different states, such as "0"-states and "1"-states, are automatically detected.

19. The detector system according to claim 17, wherein the local oscillator (3) is an uncooled laser.

20. The detector system according to claim 17, wherein the local oscillator (3) is a temperature controlled laser.

21. The detector system according to claim 16, wherein said one of the states is a state with the highest amplitude.

22. The detector system according to claim 16, wherein said local oscillator frequency-offset is greater than the bandwidth of the opto-electrical converter(s).

23. The detector system according to claim 16, wherein said local oscillator frequency-offset is selected to be approx. 1.2 times the bandwidth of the opto-electrical converter(s).

24. An optical communication system comprising at least one transmitter and at least one receiver comprising the detector system according to claim 16.

25. The optical communication system according to claim 24, wherein said transmitter is configured to generate a combined AM and FM signal by one or more combined AM and FM device(s).

26. The optical communication system according to claim 24, wherein said transmitter is configured to generate a combined AM and FM signal by one or more separate AM devices and by one or more separate FM devices.

27. The optical communication system according to claim 24, wherein the transmitter is configured for performing the method of combining said encoded optical signal with light from a local oscillator configured with a local oscillator frequency;

converting the combined local oscillator and encoded optical signal into one or more electrical signals by means of at least one opto-electrical converter having a predefined frequency bandwidth, thereby providing an amplified and encoded electrical signal having one or more encoded signal current(s), where one type of states have a higher oscillation frequency than other type of states;

rectifying the encoded signal current(s), thereby obtaining an encoded power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal;

wherein said local oscillator frequency-offset is selected to be between 1 and 1.5 times the predefined frequency bandwidth of the opto-electrical converter, and wherein said encoding or decoding of a combined AM and FM signal is using two or more levels and wherein the receiver is configured for performing the method of combining said encoded optical signal with light from a local oscillator configured with a local oscillator frequency;

converting the combined local oscillator and encoded optical signal into one or more electrical signals by means of at least one opto-electrical converter having a predefined frequency bandwidth, thereby providing an amplified and encoded electrical signal having one or more encoded signal current(s), where one type of states have a higher oscillation frequency than other type of states;

rectifying the encoded signal current(s), thereby obtaining an encoded power spectrum, wherein said power spectrum has different states, such as "0"-states and "1"-states, with different power levels such that they can be discriminated, said local oscillator frequency is defined by a positive local oscillator frequency-offset from the frequency of one of the states in said encoded optical signal;

wherein said local oscillator frequency-offset is selected to be between 1 and 1.5 times the predefined frequency bandwidth of the opto-electrical converter.

* * * * *